United States Patent
Baghel et al.

(10) Patent No.: US 9,992,652 B2
(45) Date of Patent: Jun. 5, 2018

(54) GROUP PRIORITY HANDLING FOR WIRELESS COMMUNICATION

(71) Applicant: QUALCOMM Incorporated, San Diego, CA (US)

(72) Inventors: Sudhir Kumar Baghel, Bridgewater, NJ (US); Saurabha Rangrao Tavildar, Jersey City, NJ (US); Shailesh Patil, Raritan, NJ (US); Kapil Gulati, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/808,154

(22) Filed: Jul. 24, 2015

(65) Prior Publication Data

US 2016/0080920 A1 Mar. 17, 2016

Related U.S. Application Data

(60) Provisional application No. 62/049,345, filed on Sep. 11, 2014.

(51) Int. Cl.
*H04W 4/22* (2009.01)
*H04W 72/02* (2009.01)
(Continued)

(52) U.S. Cl.
CPC ........... *H04W 4/22* (2013.01); *H04L 67/1044* (2013.01); *H04W 68/005* (2013.01);
(Continued)

(58) Field of Classification Search
CPC ... H04W 76/023; H04W 8/005; H04W 72/02; H04W 84/18; H04W 72/10; H04L 67/1044
See application file for complete search history.

(56) References Cited

U.S. PATENT DOCUMENTS

| 6,674,765 B1 | 1/2004 | Chuah et al. |
| 2012/0182962 A1 | 7/2012 | Patil et al. |

(Continued)

OTHER PUBLICATIONS

3GPP, "3rd Generation Partnership Project; Technical Specification Group Services and System Aspects; Proximity-based Services (ProSe); Stage 2 (Release 12)," 3GPP TS 23.303 v12.1.0 (Jun. 2014), Technical Specification, Jun. 2014, pp. 1-60, 3rd Generation Partnership Project.

(Continued)

*Primary Examiner* — Nam Huynh
(74) *Attorney, Agent, or Firm* — Clint R. Morin; Holland & Hart LLP

(57) ABSTRACT

Methods, systems, and devices are described for wireless communication at a UE. In accordance with the present disclosure, a number of user devices in a network may be divided into a plurality of service groups based in part on priority levels associated with each group. In some examples, a network may distribute a plurality of resource pools to each of the above-assigned groups. Thus, for proximity based service (ProSe) communication, user devices within each group may select resource pools corresponding to the priority levels of the groups associated with the user device. Thus, in accordance with the present disclosure, division of resources based on priority levels of groups and UEs may ensure greater reliability of access to resources for high priority communication.

23 Claims, 17 Drawing Sheets

(51) Int. Cl.
| | |
|---|---|
| *H04L 29/08* | (2006.01) |
| *H04W 68/00* | (2009.01) |
| *H04W 76/02* | (2009.01) |
| *H04W 72/04* | (2009.01) |
| *H04W 76/00* | (2018.01) |
| *H04W 72/12* | (2009.01) |
| *H04W 76/06* | (2009.01) |

(52) U.S. Cl.
CPC ......... *H04W 72/02* (2013.01); *H04W 76/023* (2013.01); *H04W 72/04* (2013.01); *H04W 72/042* (2013.01); *H04W 72/1289* (2013.01); *H04W 76/007* (2013.01); *H04W 76/066* (2013.01)

(56) References Cited

U.S. PATENT DOCUMENTS

| | | | |
|---|---|---|---|
| 2013/0114531 A1 | 5/2013 | Ahn et al. | |
| 2014/0094183 A1* | 4/2014 | Gao | H04W 72/048 455/450 |
| 2015/0215903 A1* | 7/2015 | Zhao | H04W 72/04 370/329 |
| 2015/0382324 A1* | 12/2015 | Sheng | H04W 72/02 370/329 |
| 2016/0302215 A1* | 10/2016 | Sorrentino | H04W 76/023 |

OTHER PUBLICATIONS

ISA/EPO, Partial International Search Report, Int'l. App. No. PCT/US2015/042257, Oct. 8, 2015, European Patent Office, Rijswijk, NL, 6 pgs.

3GPP, "3rd Generation Partnership Project; Technical Specification Group Radio Access Network; Study on LTE Device to Device Proximity Services; Radio Aspects (Release 12)," 3GPP TR 36.843 V12.0.1 (Mar. 2014), Technical Report, Mar. 2014, pp. 1-50, XP_50770026A, 3rd Generation Partnership Project.

3GPP, "3rd Generation Partnership Project; Technical Specification Group Services and System Aspects; Group Communication System Enablers for LTE (GCSE_LTE) (Release 12)," 3GPP TS 22.468 V12.0.0 (Jun. 2013), Technical Specification, Jun. 2013, pp. 1-22, XP_50711986A, 3rd Generation Partnership Project.

General Dynamics UK Ltd., "Including the Target Group ID in the ProSe-BSR," 3GPP TSG-RAN2#87, R2-143092, Dresden, German, Aug. 18-22, 2014, 3 pgs., XP_50794217A, 3rd Generation Partnership Project.

ISA/EPO, International Search Report and Written Opinion of the International Searching Authority, Int'l. App. No. PCT/US2015/042257, Jan. 19, 2016, European Patent Office, Rijswijk, NL, 30 pgs.

LG Electronics Inc., "Resource Pool Selection with Group Priority," 3GPP TSG-RAN WG2 #88, R2-145078, San Francisco, USA, Nov. 17-21, 2014, 2 pgs., XP_50877195A, 3rd Generation Partnership Project.

LG Electronics Inc., "Support of Group Priorities," 3GPP TSG-RAN WG2 #89bis, R2-151628, Bratislava, Slovakia, May 20-24, 2015, 2 pgs., XP_50936534A, 3rd Generation Partnership Project.

Nokia et al., "D2D Communication Without Network Coverage," 3GPP TSG-RAN WG1 Meeting #74bis, R1-134535, Guangzhou, China, Oct. 7-11, 2013, 5 pgs., XP_50717638A, 3rd Generation Partnership Project.

Samsung, "Resource Pool Configuration for Type-1 Discovery," 3GPP TSG RAN WG1 Meeting #78, R1-143081, Dresden, Germany, Aug. 18-22, 2014, 5 pgs., XP_50788560A, 3rd Generation Partnership Project.

Samsung, "Mode 2 Resource Allocation for D2D Broadcast Communication," 3GPP TSG RAN WG1 Meeting #78, R1-143084, Dresden, Germany, Aug. 18-22, 2014, 4 pgs., XP_50788563A, 3rd Generation Partnership Project.

Sony, "D2D Resource Pool Access Restrictions," 3GPP TSG-RAN WG2 Meeting #87, R2-143154, Dresden, Germany, Aug. 18-22, 2014, 2 pgs., XP_50794269A, 3rd Generation Partnership Project.

ISA/EPO, Partial International Search Report of the International Searching Authority, Int'l App. No. PCT/U52015/042257, Sep. 6, 2016, European Patent Office, Rijswijk, NL, 4 pgs.

IPEA/EP, Second Written Opinion of the International Preliminary Examining Authority, Int'l Application No. PCT/US2015/042257, Nov. 18, 2016, European Patent Office, Rijswijk, NL 15 pgs.

\* cited by examiner

GROUP PRIORITY HANDLING FOR WIRELESS COMMUNICATION

CROSS REFERENCES

The present application for patent claims priority to U.S. Provisional Patent Application No. 62/049,345 by Baghel et al., entitled "Group Priority Handling for Wireless Communication," filed Sep. 11, 2014, assigned to the assignee hereof, and expressly incorporated by reference herein.

BACKGROUND

Field of Disclosure

The following relates generally to wireless communication, and more specifically to group priority handling in a wireless communication system.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Device-to-device (D2D) communications involve direct wireless communications between UEs either within or beyond the coverage area of a base station. D2D communications may be facilitated by scheduling transmissions from a base station if the devices are within a coverage area.

In many situations, wireless transmissions in D2D communications may encounter contention for the limited resources (e.g., transmission medium) from various sources, including other UEs that may be transmitting on the medium. However, in some cases, D2D communications are utilized by public safety officers such as police, fire and rescue teams, for example. Thus, resource contention that prevents public safety officers from successfully transmitting in an ad-hoc D2D communication during coordination of an emergency response may result in adverse consequences.

SUMMARY

The described features generally relate to one or more improved systems, methods, and/or apparatuses for reducing contention in a D2D wireless communication system. According to various examples, a plurality of UEs may be configured into different sets of groups, with each group associated with a different priority level. For example, in some situations, an emergency response coordination team comprising a lead emergency coordinator and the heads of the police, fire and rescue teams may be assigned to a first group associated with the highest priority level. Similarly, members of each response team or combination thereof may be assigned to a second group associated with the second highest priority level. Finally, non-emergency personnel may comprise a third group associated with the least priority level.

In accordance with the present disclosure, a network may distribute a plurality of resource pools to each of the above-assigned groups. Specifically, in some examples, the network may allocate different priority levels to each of the available resource pools. Thus, for proximity based service (ProSe) communication, UEs within each group may select resource pools corresponding to the priority levels of the groups associated with the UE. As a result, high priority UEs may limit contention for resources from lower priority UEs.

In some examples, UEs within a group may further be allocated a UE-specific priority. For example, within the first group comprising a lead coordinator and the heads of the police, fire and rescue teams, the lead emergency coordinator may be allocated the highest priority, while the heads of the police, fire and rescue teams may be allocated a lower priority. Thus, scheduling of traffic transmission within the first group may further be based on UE-specific priority levels. Such division of resources based on priority levels of groups and UEs may ensure greater reliability of access to the resources for high priority communication. Although the example above was described with reference to public safety officers, it should be understood by those in the art that aspects of the present disclosure may be adopted for any number situations to reduce contention on the network.

A method of wireless communication at a UE is described. The method may include determining, by a first device, a first priority level of a transmission, wherein the first device is associated with at least one service group, selecting a first resource pool for proximity service (ProSe) communications corresponding with the determined first priority level, and transmitting data to a second device using one or more resources from the selected first resource pool.

An apparatus for wireless communication at a UE is described. The apparatus may include means for determining, by a first device, a first priority level of a transmission, wherein the first device is associated with at least one service group, means for selecting a first resource pool for ProSe communications corresponding with the determined first priority level, and means for transmitting data to a second device using one or more resources from the selected first resource pool.

A further apparatus for wireless communication at a UE is described. The apparatus may include a processor, memory in electronic communication with the processor, and instructions stored in the memory, wherein the instructions are executable by the processor to determine, by a first device, a first priority level of a transmission, wherein the first device is associated with at least one service group, select a first resource pool for ProSe communications corresponding with the determined first priority level, and transmit data to a second device using one or more resources from the selected first resource pool.

A non-transitory computer-readable medium storing code for wireless communication at a UE is described. The code may include instructions executable to determine, by a first device, a first priority level of a transmission, wherein the first device is associated with at least one service group, select a first resource pool for ProSe communications corresponding with the determined first priority level, and transmit data to a second device using one or more resources from the selected first resource pool.

In some examples of the method, apparatuses, or non-transitory computer-readable medium described above, the first priority level of the transmission is based at least in part on a device priority level associated with the first device or the second device. Additionally or alternatively, in some examples the first priority level of the transmission is based at least in part on a service group priority level associated with the first device or the second device.

Some examples of the method, apparatuses, or non-transitory computer-readable medium described above may further include transmitting data to the second device during a period corresponding with a device priority level of the first device. Additionally or alternatively, some examples may include receiving a message identifying priority levels of a plurality of resource pools, the message being a system information block (SIB) message or a dedicated radio resource control (RRC) message.

Some examples of the method, apparatuses, or non-transitory computer-readable medium described above may further include determining that none of the plurality of resource pools identified in the message are associated with the first priority level, and transmitting a notification message to a network device, the notification message requesting the network device to adjust priority levels of the plurality of resource pools. In some cases the notification message comprises a service group identification (ID) and the first priority level of the transmission. Additionally or alternatively, some examples may include detecting contention for the one or more resources from the selected first resource pool, selecting a second resource pool based at least in part on the detecting, the second resource pool associated with a second priority level, and transmitting data to the second device using one or more resources from the selected second resource pool.

In some examples of the method, apparatuses, or non-transitory computer-readable medium described above, the second priority level associated with the second resource pool is lower than the first priority level associated with the first resource pool. Additionally or alternatively, in some examples the first resource pool comprises a scheduling assignment (SA) resource pool or data resource pools or combination thereof. In some examples of the method, apparatuses, or non-transitory computer-readable medium described above, the first device is preconfigured to be associated with the at least one service group. Additionally or alternatively, in some examples the at least one service group is associated with a unique group identification (ID).

A method of wireless communication at a base station is described. The method may include receiving a notification message from a first device, identifying priority levels for each of a plurality of resource pools used for ProSe communications, the priority levels based at least in part on the notification message, and adjusting at least one of the identified priority levels of at least one of the plurality of resource pools.

An apparatus for wireless communication at a base station is described. The apparatus may include means for receiving a notification message from a first device, means for identifying priority levels for each of a plurality of resource pools used for ProSe communications, the priority levels based at least in part on the notification message, and means for adjusting at least one of the identified priority levels of at least one of the plurality of resource pools.

A further apparatus for wireless communication at a base station is described. The apparatus may include a processor, memory in electronic communication with the processor, and instructions stored in the memory, wherein the instructions are executable by the processor to receive a notification message from a first device, identify priority levels for each of a plurality of resource pools used for ProSe communications, the priority levels based at least in part on the notification message, and adjust at least one of the identified priority levels of at least one of the plurality of resource pools.

A non-transitory computer-readable medium storing code for wireless communication at a base station is described. The code may include instructions executable to receive a notification message from a first device, identify priority levels for each of a plurality of resource pools used for ProSe communications, the priority levels based at least in part on the notification message, and adjust at least one of the identified priority levels of at least one of the plurality of resource pools.

Some examples of the method, apparatuses, or non-transitory computer-readable medium described above may further include transmitting a response message to the first device, the response message identifying the adjusted priority levels of the at least one of the plurality of resource pools. Additionally or alternatively, in some examples the response message instructs the first device to wait a predetermined time period before transmitting data on at least one of the plurality of resource pools. In some examples of the method, apparatuses, or non-transitory computer-readable medium described above, the notification message comprises a service group identification (ID) and a service group ID priority level.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
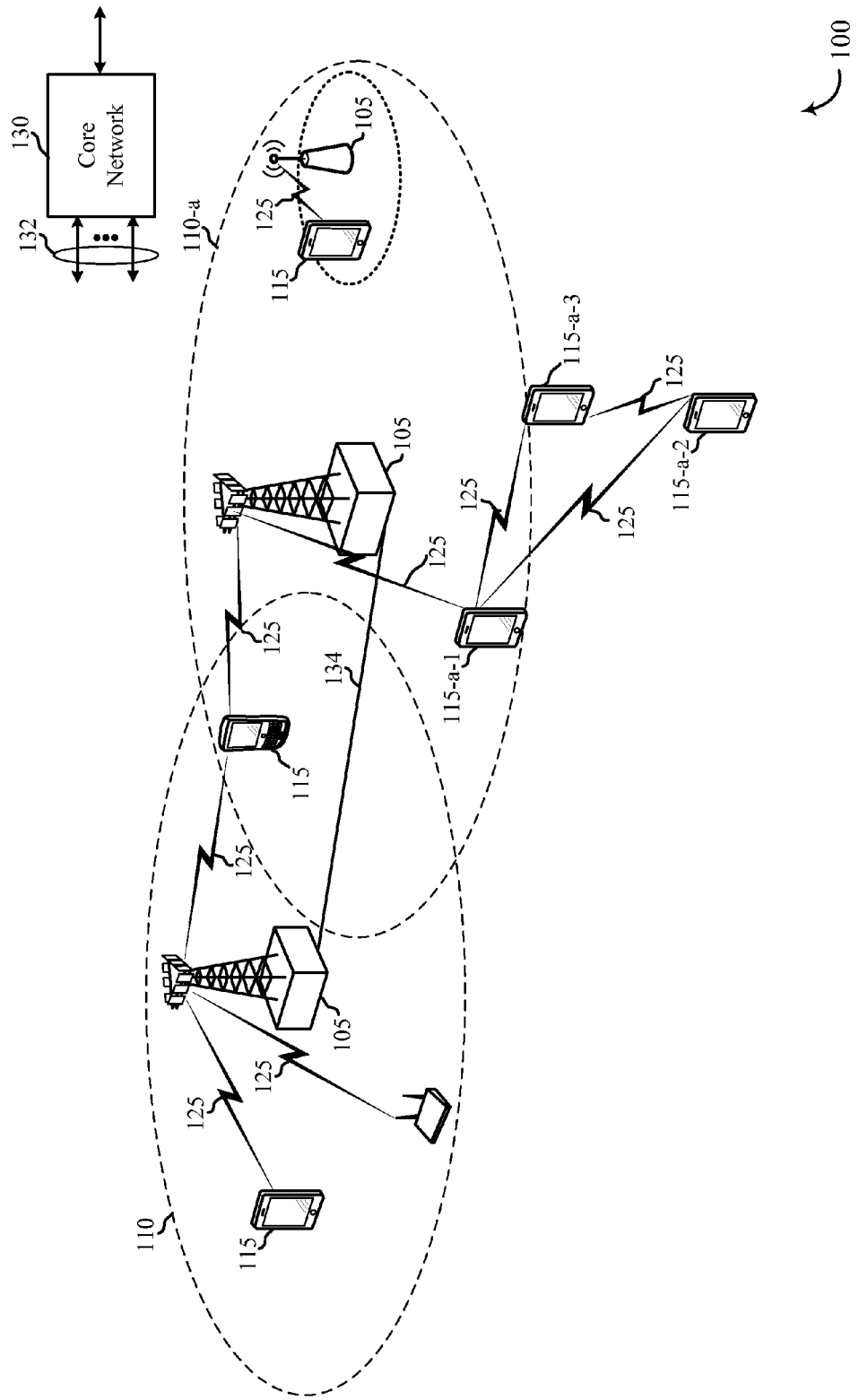
FIG. 1 illustrates an example of a wireless communications system in accordance with various aspects of the present disclosure.

The described features generally relate to improved systems, methods, and/or apparatuses for reducing contention in a D2D wireless communication system. In an ad-hoc Mode 2 ProSe communication, a device (e.g., a UE) may experience contention for resources (e.g., transmission medium) from other UEs on the network. As a result of the contention between multiple UEs, the data packets scheduled for transmission by the device may be dropped from the medium. However, during a high priority communication such as emergency response coordination, it may be critical for certain users to ensure reliable access to the limited resources.

In accordance with the present disclosure, the resource contention among plurality of UEs may be reduced by limiting the number of UEs that may challenge for certain transmission resources. In some examples, one or more UEs may be assigned to different sets of groups based on device-specific identification. For instance, in some situations, an emergency response coordination team comprising a lead emergency coordinator and the heads of the police, fire and rescue teams may be assigned to a first group associated with the highest priority level. Similarly, members of each response team or combination thereof may be assigned to a second group associated with the second highest priority level. Finally, non-emergency personnel may comprise a third group associated with the least priority level. It should be understood by those in the art that the number of service groups may vary based on the number of UEs in the network and/or priority topology of the service groups.

In some examples, each set of above-disclosed groups may be assigned at least one resource pool corresponding to the priority level of each group. In one example, the network may notify the device of the resource assignments by transmitting a system information block (SIB) message or a dedicated radio resource control (RRC) message. Based on the received message, the device may determine the priority level of at least one service group associated with the device, and thus select a resource pool for proximity service (ProSe) communication that correlates with the determined priority level. Therefore, in the above described example, only UEs corresponding to the first group may select resource pools associated with the highest priority level. Similarly, the UEs corresponding to the second group may utilize resource pools of the second priority level for data transmission.

In accordance with the present disclosure, a lower priority level group may be restricted from selecting a higher priority level resource pool for data transmission. However, in some examples, UEs corresponding to the higher priority level may select a lower priority pool. For instance, UEs associated with the first group may utilize resource pools allocated to the first and the second service groups. In some situations, the selection of a lower priority pool may be based on a number of factors, including interference or contention detection on the first resource pool. In some examples, contention for resources within a group may be further reduced by allocating UE-specific priorities to each device within the group. As a result, data transmission schedule within a group may be based on UE-specific priority level of the device. Thus, in accordance with the present disclosure, division of resources based on priority levels of groups and UEs may provide greater reliability of access to resources for high priority communication.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communication links 125 may also be established between UEs 115 in a configuration known as device-to-device (D2D) communications. One or more of a group of UEs (for example, a first UE 115-*a*-1) utilizing D2D communications may be within a coverage area 110-*a* of a cell. Other UEs (for example a second UE 115-*a*-2 and a third UE 115-*a*-3) in such a group may be outside the coverage area 110-*a* of the cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

In some examples, one or more UEs 115 may be associated with at least one service group based on the UE identification. For example, a first UE 115-*a*-1, a second UE 115-*a*-2 and a third UE 115-*a*-3 may be assigned to the first service group, while remaining UEs 115 in the network may be associated with a second service group. In one example, the first service group comprising UEs 115-*a* may be designated as a high priority service group based on UE identifications. As a result, in accordance with one example of the present disclosure, the first service group may be allocated a higher priority resource pool for transmission on the network over the second service group. In some examples, the base station 105 may notify the UEs 115 of the resource pool assignments by transmitting a system information block (SIB) message or a dedicated radio resource control (RRC) message. In other examples, the notification message may include a dedicated signal to the UEs 115. Based on the received message, the UEs 115-*a* may select at least one of a first or second resource pool associated with the priority level associated with the first service group.

Figure 2:
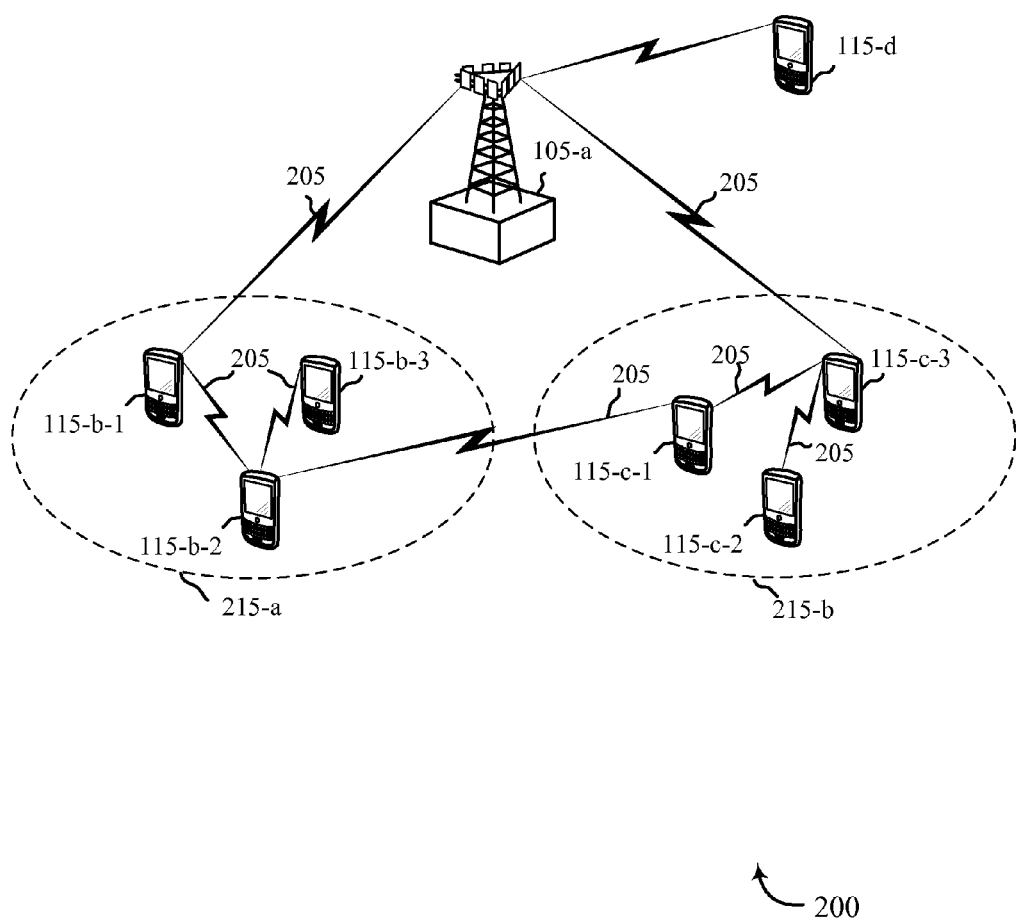
FIG. 2 illustrates an example of a wireless communications subsystem for group priority handling for D2D communication in accordance with various aspects of the present disclosure.

FIG. 2 illustrates an example of a wireless communications system 200 for group priority handling for D2D communication in accordance with various aspects of the present disclosure. The wireless communications system 200 of FIG. 2 may be an example of the wireless communications system 100 described with respect to FIG. 1. In one configuration, a base station 105-*a* may communicate with one or more devices 115 that fall within a coverage area of the base station 105-*a*. An in-coverage device 115 may receive/transmit communications from/to the base station 105-*a*. One or more device(s) 115 may be outside of the coverage area of the base station 105-*a* and may participate in D2D communications. Other user devices 115 may be within the coverage area of the base station 105-*a*, but may also still participate in D2D communications. The base station 105-*a* and the user devices 115 may be examples of the base stations 105 and user devices 115 described with reference to FIG. 1.

In one example, a plurality of user devices 115 may be allocated to a priority of service groups 215. For instance, a plurality of user devices 115-*b* may form a first service group 215-*a*, while multiple user devices 115-*c* may be assigned to a second service group 215-*b*. In one example, the first service group comprising user devices 115-*b* may be allocated a higher priority level than the second service group 215-*b* comprising a second set of user devices 115-*c*. It should be understood by those in the art that not all user devices communicating in the network may be designated to one or more service groups 215. For example, a user device 115-*d* may be a stand-alone user device configured to communicate with the base station 105-*a*. Additionally or alternatively, the user device 115-*d* may also be designated as a single device service group with varying priority levels.

In one configuration, a base station 105-*a* may allocate resource pools to a plurality of service groups 215 by transmitting a SIB message or a RRC message to the user devices 115. A user device 115 configured to transmit a packet on the network during a mode 2 transmission may determine the service group priority level associated with the user device and select corresponding scheduling assignment (SA) and data transmission resource pools based on the received message. In some examples, a higher priority user device (e.g., user device 115-*b*-2) may select a lower priority resource pool associated with the second service group 215-*b* if the user device 115-*b*-2 detects contention from other user devices (e.g., user devices 115-*b*-1 and/or 115-*b*-3) on the higher resource pool associated with its service group. As a result, the higher priority user device 115-*b*-2 may select and utilize resource pool allocated to the service group 215-*b* to transmit packets on the network. However, user devices 115-*c* associated with a lower priority service groups 215-*b* may be restricted or inhibited from utilizing resource pools associated with a higher priority pool.

In some examples, in order to limit contention within a service group 215 for allocated resource pools, each user device (e.g., UE 115-*b*) within the service group (e.g., 215-*a*) may be assigned a device specific priority based on the user identification parameters. Thus, in one example, user device 115-*b*-1 may be assigned a first UE-specific priority within service group 215-*a* based on a determination that the user device 115-*b*-1 is associated with the lead emergency coordinator. Conversely, user device 115-*b*-2 may be assigned a second device-specific priority and device 115-*b*-*c* the third device-specific priority based on parameters associated with each user device 115. As a result, in some examples, contention between user devices within the service groups 215 may be resolved by scheduling the higher priority user device (e.g., 115-*b*-1) to transmit prior to the priority user devices (e.g., 115-*b*-2 and/or 115-*b*-3). However, in other examples, each user device 115 within service group 215 may be allocated same level of priority.

Figure 3:
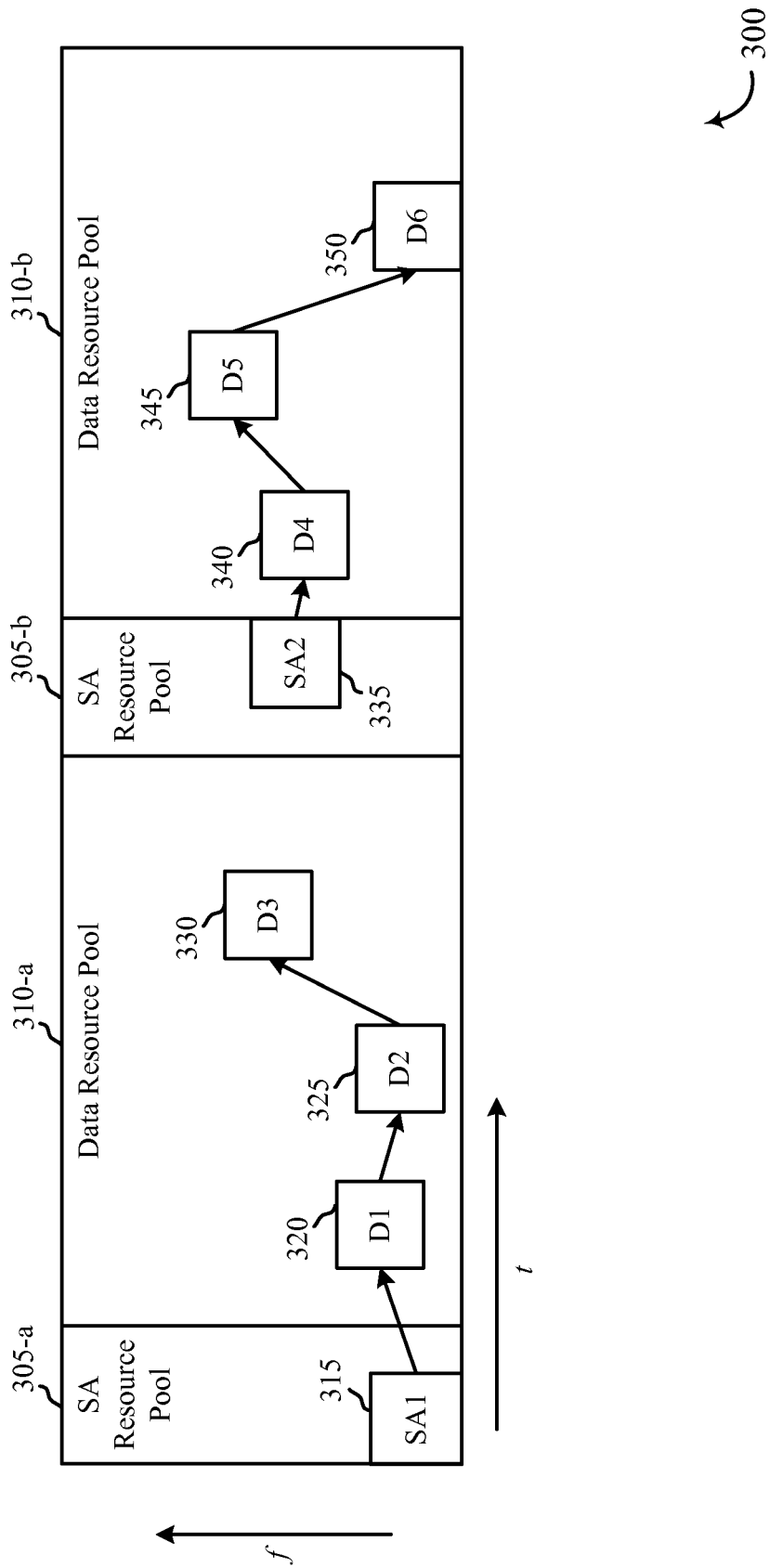
FIG. 3 illustrates an example of scheduling assignment (SA) resource pools and data resource pools for transmission of SAs and data in accordance with various aspects of the present disclosure.

FIG. 3 illustrates an example 300 of scheduling assignment (SA) resource pools and data resource pools for transmissions of SAs and data, in accordance with various aspects of the present disclosure. Specifically, FIG. 3 illustrates a first SA resource pool 305-*a* and a first data resource pool 310-*a*, and a second SA resource pool 305-*b* and a second data resource pool 310-*b*. The resource pools 305 and 310 may be used to transmit messages 315-350, such as SAs and data, between UEs, such as UEs 115 in FIGS. 1-2, in D2D communications, for example. The messages 315 through 350 may be transmitted, for example, in LTE subframes from a transmitting D2D UE to one or more receiving D2D UEs.

In some examples, a network may allocate all or part of SA resource pools 305 and/or data resource pools 310 to a first service group associated with a first set of UEs having a first priority level. Similarly, the network may allocate all or part of the SA resource pools 305 and/or data resource pools 310 to a second service group associated with a second set of UEs having a second priority level. It should be appreciated by those in the art that the SA resource pools 305 and the data resource pools 310 may be distributed to any number of designated service groups. In one example, the network may allocate the first resource pool (i.e., SA resource pool 305-a and/or data resource pool 310-a) for utilization by the first service group. Similarly, the network may allocate the second resource pool (i.e., SA resource pool 305-b and/or data resource pool 310-b) for utilization by the second service group. Thus, a plurality of UEs from each of the first and the second service groups may utilize resource pools associated with the priority level of the service group.

Additionally or alternatively a user device within a service group may determine that none of the plurality of the SA resource pool 305 and/or data resource pool 310 identified in a SIB or RRC message are associated with the priority of the UEs' service group. As a result, the user device may transmit a notification message to a network device (e.g., base station) requesting the network device to adjust the priority levels of the resource pools 300 to accommodate the user device. In such an example, the base station may adjust the priority of at least one SA resource pool 305 and/or data resource pool 310 to accommodate the user device request. In one example, the base station may respond to the user device with message requesting the UE to wait for a predetermined time period prior to scheduling a retransmission on the network.

Figure 4:
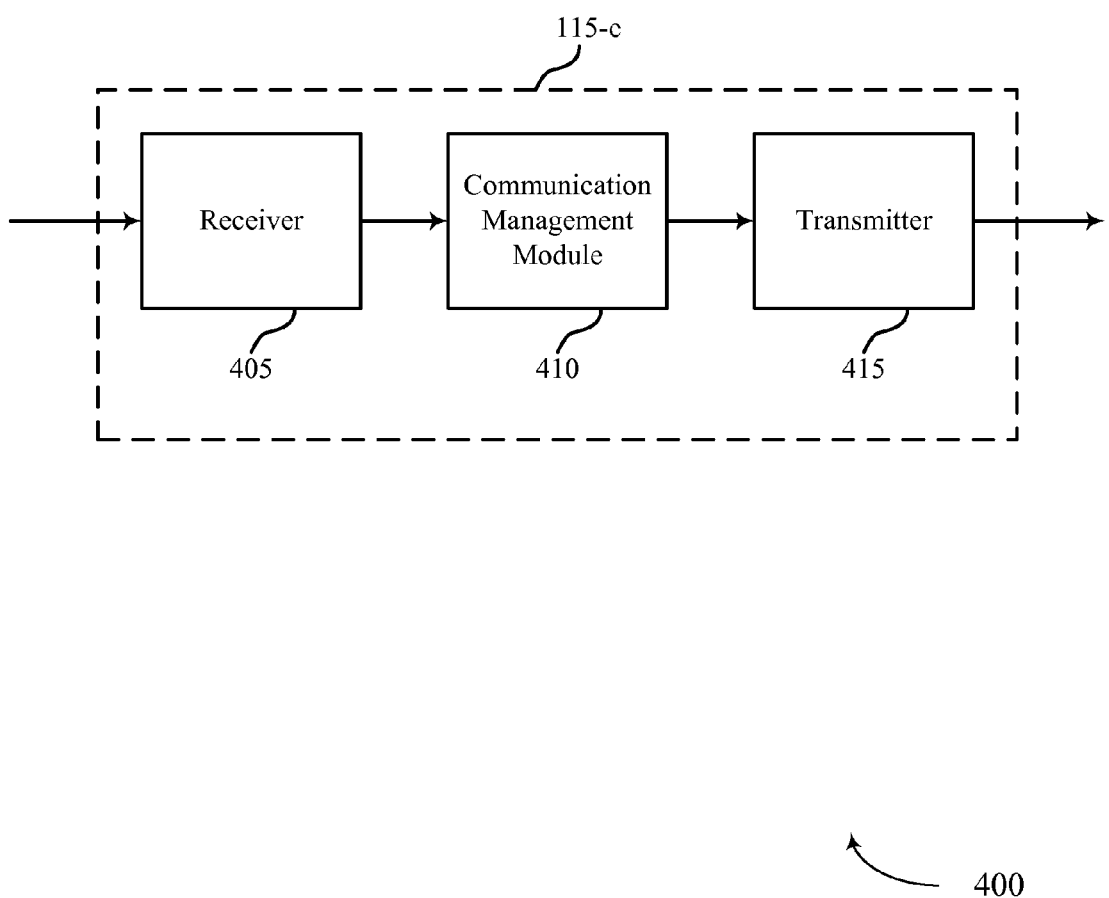
FIG. 4 shows a block diagram of a user equipment (UE) for group priority handling for wireless D2D communication in accordance with various aspects of the present disclosure.

FIG. 4 shows a block diagram 400 of a UE 115-e for group priority handling for wireless D2D communication in accordance with various aspects of the present disclosure. The UE 115-e may be an example of aspects of a UE 115 described with reference to FIGS. 1-3. The UE 115-e may include a receiver 405, a communication management module 410, and/or a transmitter 415. The UE 115-e may also include a processor. Each of these components may be in communication with each other.

The components of the UE 115-e may, individually or collectively, be implemented with at least one application specific integrated circuit (ASIC) adapted to perform some or all of the applicable functions in hardware. Alternatively, the functions may be performed by one or more other processing units (or cores), on at least one IC. In other cases, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 405 may receive information such as packets, user data, and/or control information associated with various information channels (e.g., control channels, data channels, and information related to group priority handling for D2D communication, etc.). Information may be passed on to the communication management module 410, and to other components of the UE 115-e. In some examples, the receiver 405 may receive a message identifying priority levels of a plurality of resource pools, the message may be a SIB message or a dedicated RRC message.

The communication management module 410 may identify at least one service group associated with a first device, and determine a first priority level of the at least one service group. In some examples, the communication management module 410 may select a first resource pool for ProSe communications corresponding with the determined first priority level, and transmit data to a second device using one or more resources from the selected first resource pool.

The transmitter 415 may transmit signals received from other components of the UE 115-e. In some cases, the transmitter 415 may be collocated with the receiver 405 in a transceiver module. The transmitter 415 may include a single antenna, or it may include a plurality of antennas. In some examples, the transmitter 415 may transmit data to a second device using one or more resources from the selected first resource pool. In some examples, the transmitter 415 may transmit data to the second device during a period corresponding with the second priority level of the first device. Specifically, the device may transmit data in accordance with the priority of UE 115-e with respect to other UEs in the service group. In some examples, the transmitter 415 may transmit data to the second device using one or more resources from the selected second resource pool.

Figure 5:
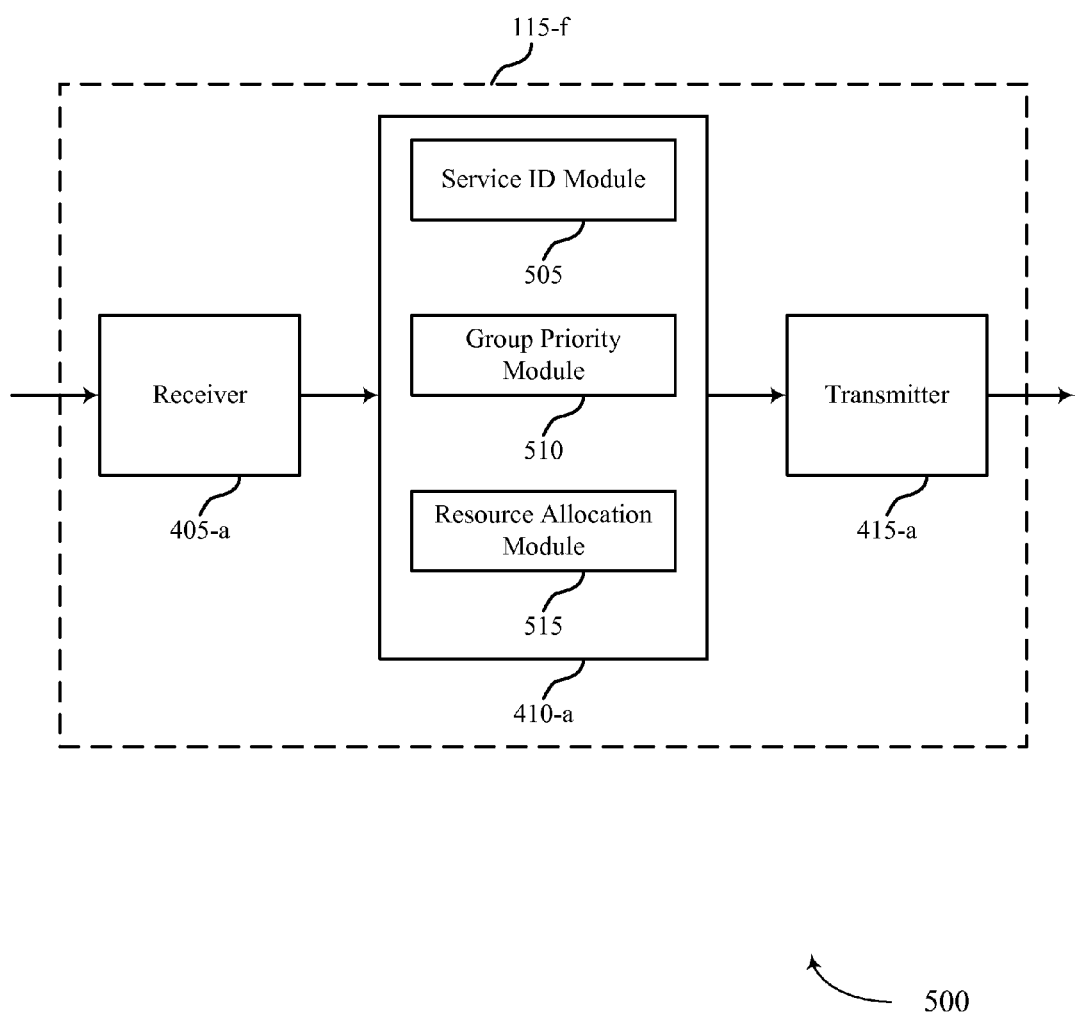
FIG. 5 shows a block diagram of a UE for group priority handling for wireless D2D communication in accordance with various aspects of the present disclosure.

FIG. 5 shows a block diagram 500 of a UE 115-f for group priority handling for wireless D2D communication in accordance with various aspects of the present disclosure. The UE 115-f may be an example of aspects of a UE 115 described with reference to FIGS. 1-4. The UE 115-f may include a receiver 405-a, a communication management module 410-a, and/or a transmitter 415-a. The UE 115-f may also include a processor. Each of these components may be in communication with each other. The communication management module 410-a may also include a service ID module 505, a group priority module 510, and a resource allocation module 515.

The components of the UE 115-f may, individually or collectively, be implemented with at least one ASIC adapted to perform some or all of the applicable functions in hardware. Alternatively, the functions may be performed by one or more other processing units (or cores), on at least one IC. In other cases, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 405-a may receive information which may be passed on to the communication management module 410-a, and to other components of the UE 115-f. The communication management module 410-a may perform the operations described above with reference to FIG. 4. The transmitter 415-a may transmit signals received from other components of the UE 115-f.

The service ID module 505 may identify at least one service group associated with the UE 115-f as described above with reference to FIGS. 2-3. In some examples, the at least one service group may be associated with a unique group ID. The group priority module 510 may determine a first priority level of the at least one service group as described above with reference to FIGS. 2-3. In some examples, the second priority level associated with the second resource pool may be lower than the first priority level associated with the first resource pool.

The resource allocation module 515 may select a first resource pool for ProSe communications corresponding with the determined first priority level as described above with reference to FIGS. 2-3. The resource allocation module 515 may also select a second resource pool based at least in part on the detecting, the second resource pool associated with a second priority level as described above with reference to FIGS. 2-3. In some examples, the resource pool comprises a scheduling assignment (SA) resource pool or data resource pools or combination thereof.

Figure 6:
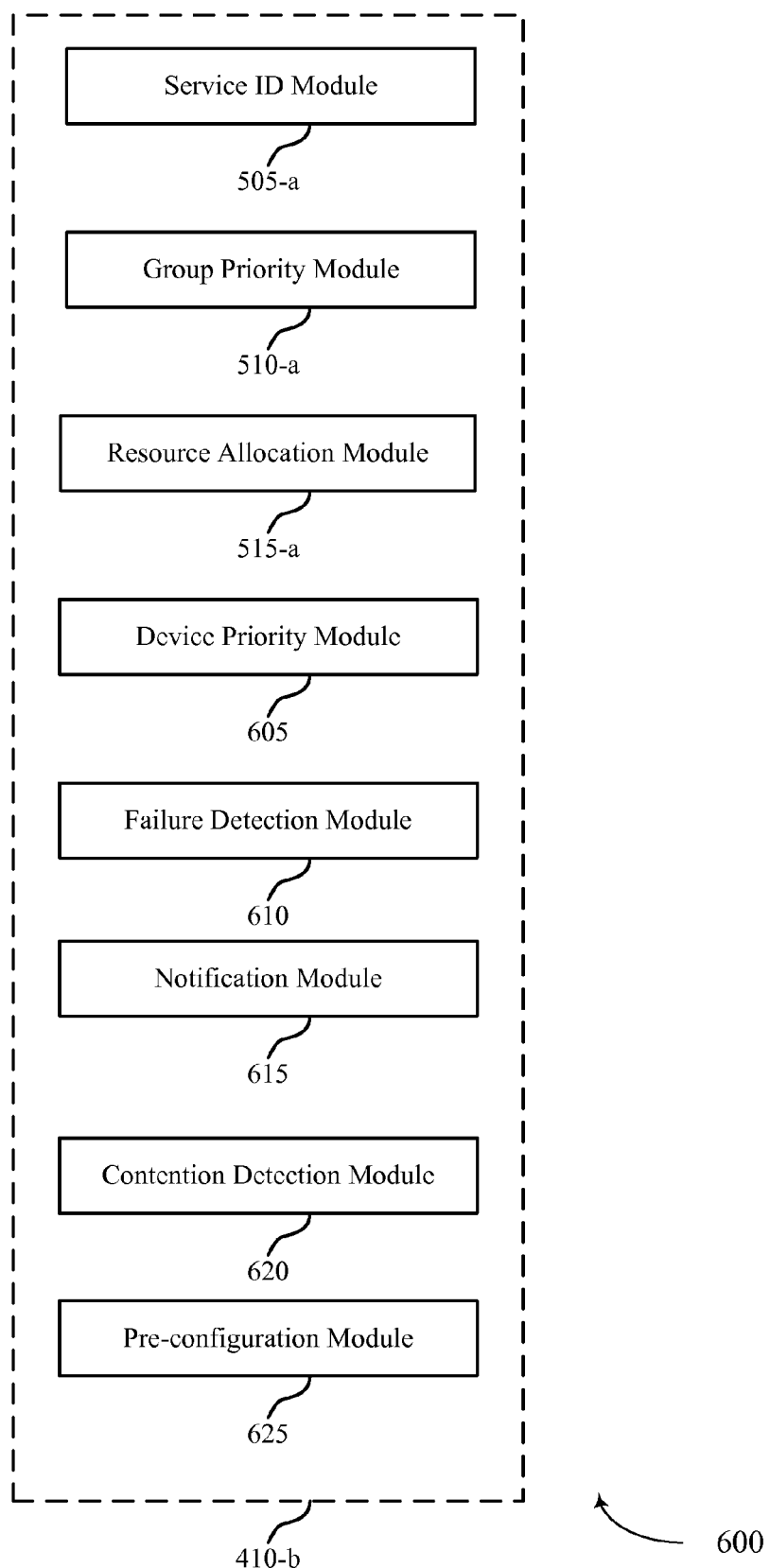
FIG. 6 shows a block diagram of a communication management module for group priority handling for mode 2 communication in accordance with various aspects of the present disclosure.

FIG. 6 shows a block diagram 600 of a communication management module 410-*b* for group priority handling for mode 2 communication in accordance with various aspects of the present disclosure. The communication management module 410-*b* may be an example of aspects of a communication management module 410 described with reference to FIGS. 4-5. The communication management module 410-*b* may include a service ID module 505-*a*, a group priority module 510-*a*, and a resource allocation module 515-*a*. Each of these modules may perform the functions described above with reference to FIG. 5. The communication management module 410-*b* may also include a device priority module 605, a failure detection module 610, a notification module 615, a contention detection module 620, and a pre-configuration module 625.

The components of the communication management module 410-*b* may, individually or collectively, be implemented with at least one ASIC adapted to perform some or all of the applicable functions in hardware. Alternatively, the functions may be performed by one or more other processing units (or cores), on at least one IC. In other cases, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The device priority module 605 may identify a second priority level of the first device within the at least one service group as described above with reference to FIGS. 2-3. In some examples, the failure detection module 610 may determine that none of the plurality of resource pools identified in the message are associated with the first priority level as described above with reference to FIGS. 2-3. The notification module 615 may transmit a notification message to a network device, the notification message requesting the network device to adjust the priority levels of the plurality of resource pools, wherein the notification message comprises a service group ID and the first priority level of the at least one service group as described above with reference to FIGS. 2-3.

In accordance with the present disclosure, the contention detection module 620 may detect contention for the one or more resources from the selected first resource pool as described above with reference to FIGS. 2-3. In some cases, the pre-configuration module 625 may be configured such that the first device may be preconfigured to be associated with the at least one service group as described above with reference to FIGS. 2-3.

Figure 7:
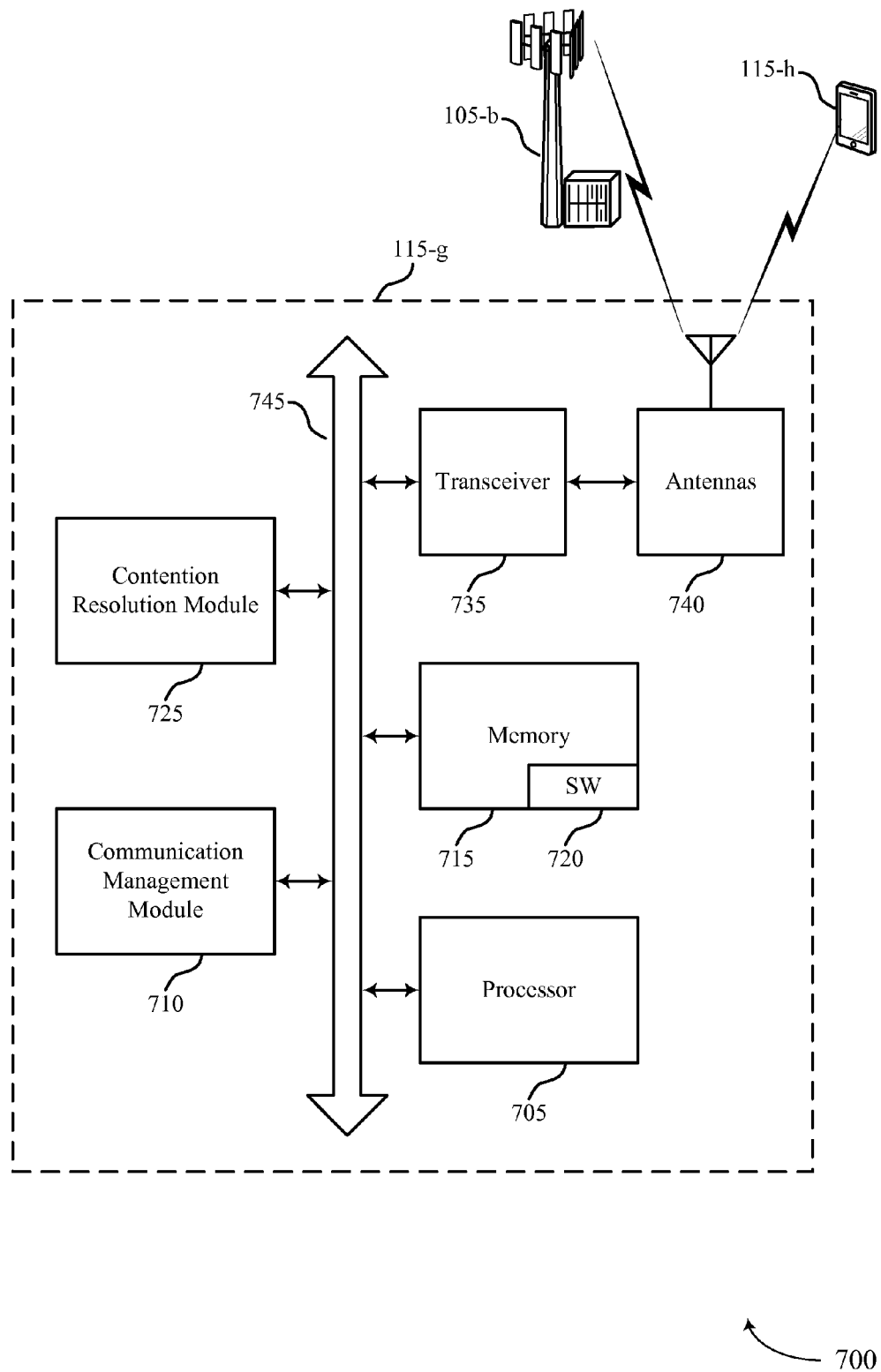
FIG. 7 shows a diagram of a system for group priority handling for mode 2 communication in accordance with various aspects of the present disclosure.

FIG. 7 shows a diagram of a system 700 for group priority handling for mode 2 communication in accordance with various aspects of the present disclosure. System 700 may include a UE 115-*g*, which may be an example of an UE 115 described above with reference to FIGS. 1-6. The UE 115-*g* may include a communication management module 710, which may be an example of a communication management module 410 described with reference to FIGS. 2-6. The UE 115-*g* may also include a contention resolution module 725. In some examples, the contention resolution module 725 may be configured to perform functionalities of contention detection module 620 described with reference to FIG. 6. The UE 115-*g* may also include components for bi-directional voice and data communications including components for transmitting communications and components for receiving communications. For example, the UE 115-*g* may communicate bi-directionally with UE 115-*h* and/or a base station 105-*b*.

The UE 115-*g* may also include a processor module 705, and memory 715 (including software (SW) 720), a transceiver module 735, and one or more antenna(s) 740, which each may communicate, directly or indirectly, with each other (e.g., via buses 745). The transceiver module 735 may communicate bi-directionally, via the antenna(s) 740 and/or wired or wireless links, with one or more networks, as described above. For example, the transceiver module 735 may communicate bi-directionally with a base station 105 and/or another UE 115. The transceiver module 735 may include a modem to modulate the packets and provide the modulated packets to the antenna(s) 740 for transmission, and to demodulate packets received from the antenna(s) 740. While the UE 115-*g* may include a single antenna 740, the UE 115-*g* may also have multiple antennas 740 capable of concurrently transmitting and/or receiving multiple wireless transmissions.

The memory 715 may include random access memory (RAM) and read only memory (ROM). The memory 715 may store computer-readable, computer-executable software/firmware code 720 including instructions that, when executed, cause the processor module 705 to perform various functions described herein (e.g., group priority handling for mode 2 communication, etc.). Alternatively, the software/firmware code 720 may not be directly executable by the processor module 705 but cause a computer (e.g., when compiled and executed) to perform functions described herein. The processor module 705 may include an intelligent hardware device, e.g., a central processing unit (CPU), a microcontroller, an ASIC, etc.

Figure 8:
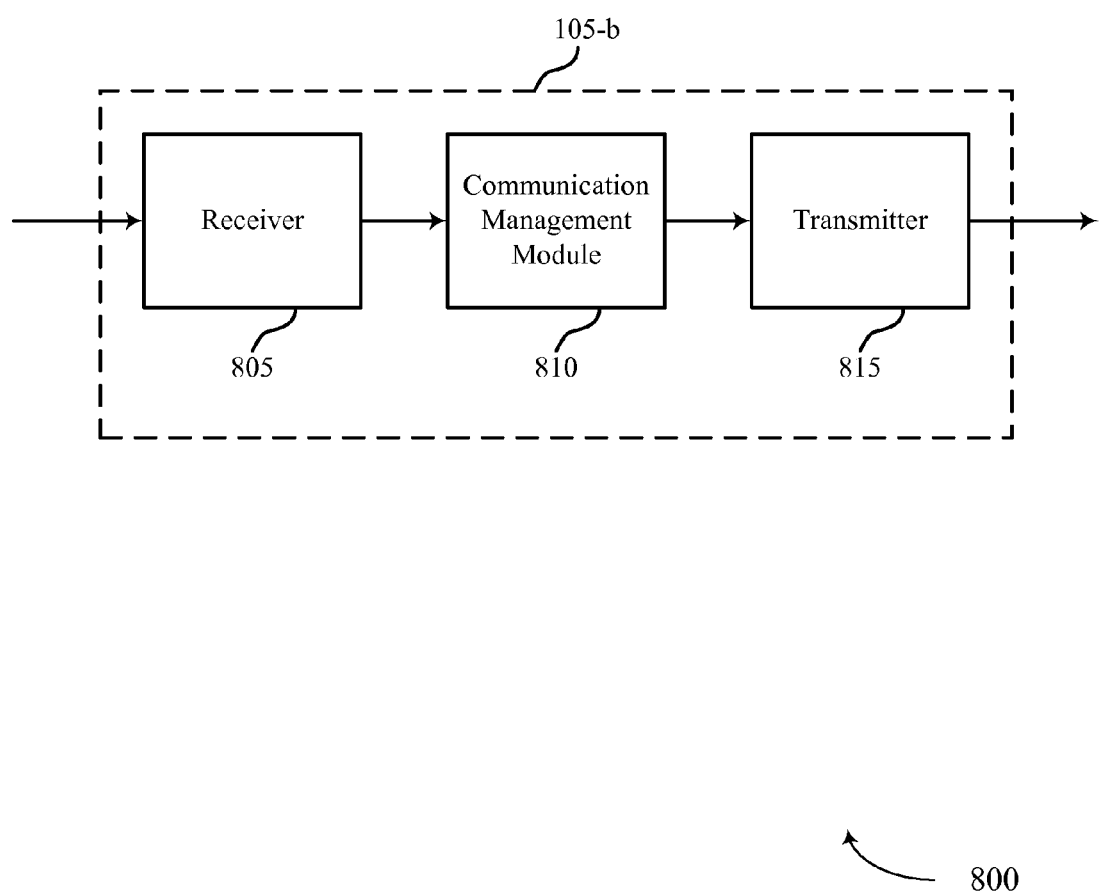
FIG. 8 shows a block diagram of a base station for reducing contention in a D2D wireless communication.

FIG. 8 shows a block diagram 800 of a base station 105-*b* for reducing contention in a D2D wireless communication. The base station 105-*b* may be an example of aspects of a base station 105 described with reference to FIGS. 1-7. The base station 105-*b* may include a receiver 805, a communication management module 810, and/or a transmitter 815. The base station 105-*b* may also include a processor. Each of these components may be in communication with each other.

The components of the base station 105-*b* may, individually or collectively, be implemented with at least one ASIC adapted to perform some or all of the applicable functions in hardware. Alternatively, the functions may be performed by one or more other processing units (or cores), on at least one IC. In other cases, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 805 may receive information such as packets, user data, and/or control information associated with various information channels (e.g., control channels, data channels, and information related to group priority handling for mode 2 communication, etc.). Information may be passed on to the communication management module 810, and to other components of the base station 105-*b*. In some examples, the receiver 805 may receive a message identifying priority levels of a plurality of resource pools, the message being a SIB message or a dedicated RRC message.

The base station communication management module 810 may receive a notification message from a first device, identify priority levels for each of a plurality of resource pools used for ProSe communications, the priority levels based at least in part on the notification message, and adjust at least one of the identified priority levels of at least one of the plurality of resource pools.

The transmitter 815 may transmit signals received from other components of the base station 105-b. In some cases, the transmitter 815 may be collocated with the receiver 805 in a transceiver module. The transmitter 815 may include a single antenna, or it may include a plurality of antennas. In some examples, the transmitter 815 may transmit data to a second device using one or more resources from the selected first resource pool. In some examples, the transmitter 815 may transmit data to the second device during a period corresponding with the second priority level of the first device. In some examples, the transmitter 815 may transmit data to the second device using one or more resources from the selected second resource pool.

Figure 9:
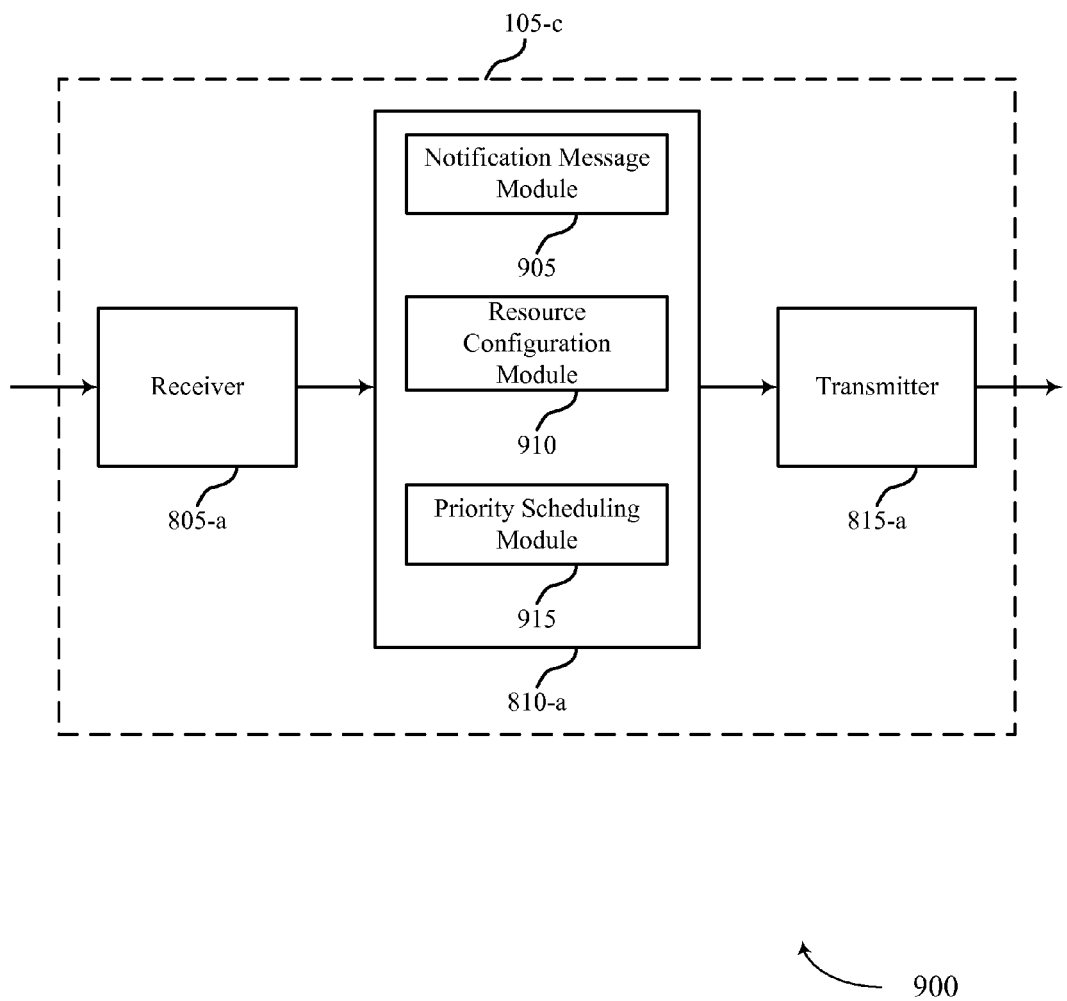
FIG. 9 shows a block diagram of a base station for group priority handling in a D2D wireless communication.

FIG. 9 shows a block diagram 900 of a base station 105-c for group priority handling in a D2D wireless communication. The base station 105-c may be an example of aspects of a base station 105 described with reference to FIGS. 1-8. The base station 105-c may include a receiver 805-a, a communication management module 810-a, and/or a transmitter 815-a. The base station 105-c may also include a processor. Each of these components may be in communication with each other. The communication management module 810-a may also include a notification message module 905, a resource configuration module 910, and a priority scheduling module 915.

The components of the base station 105-c may, individually or collectively, be implemented with at least one ASIC adapted to perform some or all of the applicable functions in hardware. Alternatively, the functions may be performed by one or more other processing units (or cores), on at least one IC. In other cases, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 805-a may receive information which may be passed on to the communication management module 810-a, and to other components of the base station 105-c. The communication management module 810-a may perform the operations described above with reference to FIG. 8. The transmitter 815-a may transmit signals received from other components of the base station 105-c.

The notification message module 905 may receive a notification message from a first device as described above with reference to FIGS. 2-3. In some examples, the notification message comprises a group ID and a group ID priority level. The resource configuration module 910 may identify priority levels for each of a plurality of resource pools used for ProSe communications, the priority levels based at least in part on the notification message. The priority scheduling module 915 may adjust at least one of the identified priority levels of at least one of the plurality of resource pools as described above with reference to FIGS. 2-3.

Figure 10:
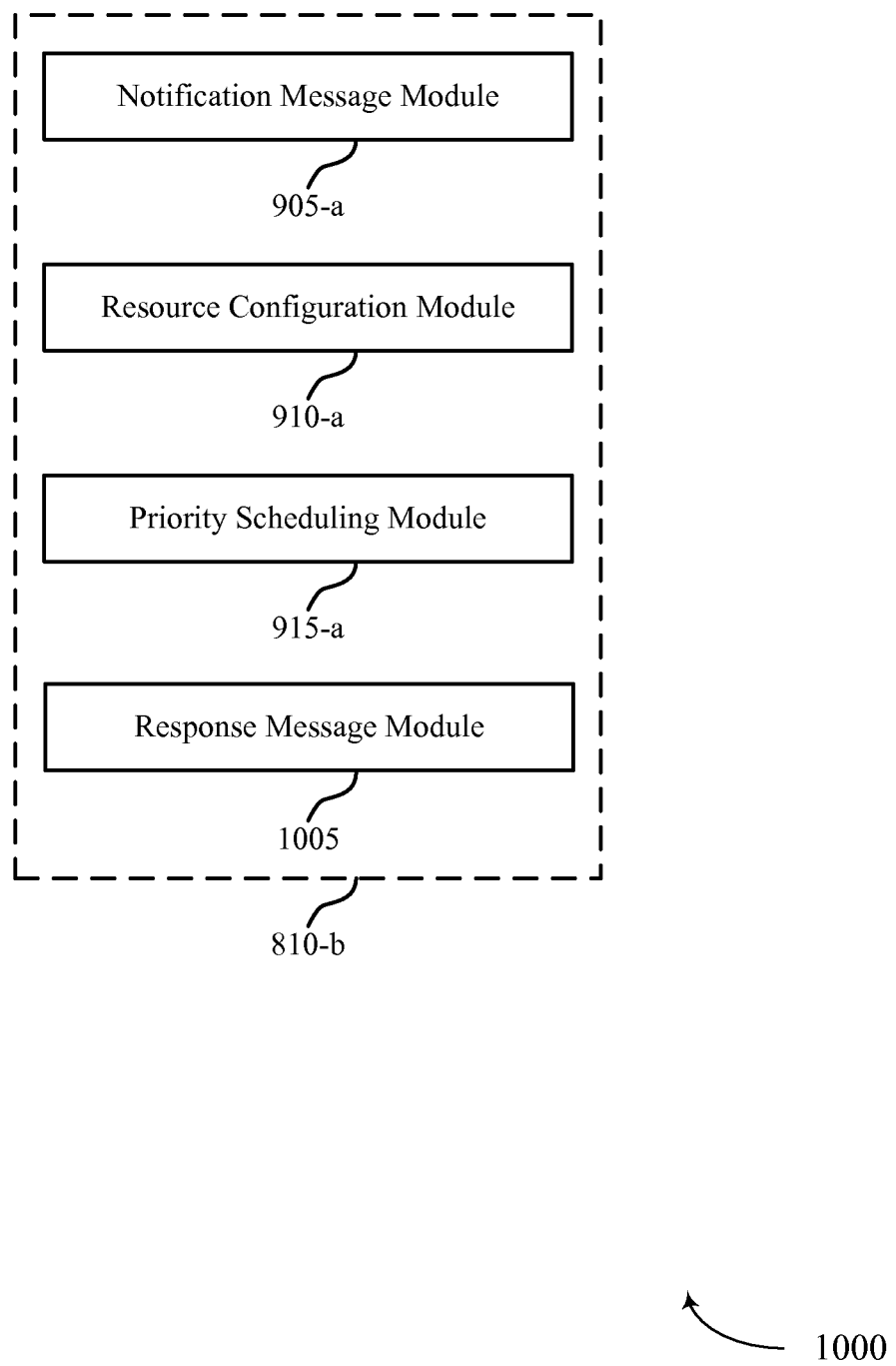
FIG. 10 shows a block diagram of a communication management module for group priority handling for mode 2 communication in accordance with various aspects of the present disclosure.

FIG. 10 shows a block diagram 1000 of a communication management module 810-b for group priority handling for mode 2 communication in accordance with various aspects of the present disclosure. The communication management module 810-b may be an example of aspects of a communication management module 810 described with reference to FIGS. 8-9. The communication management module 810-b may include a notification message module 905-a, a resource configuration module 910-a, and a priority scheduling module 915-a. Each of these modules may perform the functions described above with reference to FIG. 9. The communication management module 810-b may also include and a response message module 1005.

The components of the communication management module 810-b may, individually or collectively, be implemented with at least one ASIC adapted to perform some or all of the applicable functions in hardware. Alternatively, the functions may be performed by one or more other processing units (or cores), on at least one IC. In other cases, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The response message module 1005 may transmit a response message to the first device, the response message identifying the adjusted priority levels of the at least one of the plurality of resource pools as described above with reference to FIGS. 2-3. In some examples, the response message instructs the first device to wait a predetermined time period before transmitting data on at least one of the plurality of resource pools.

Figure 11:
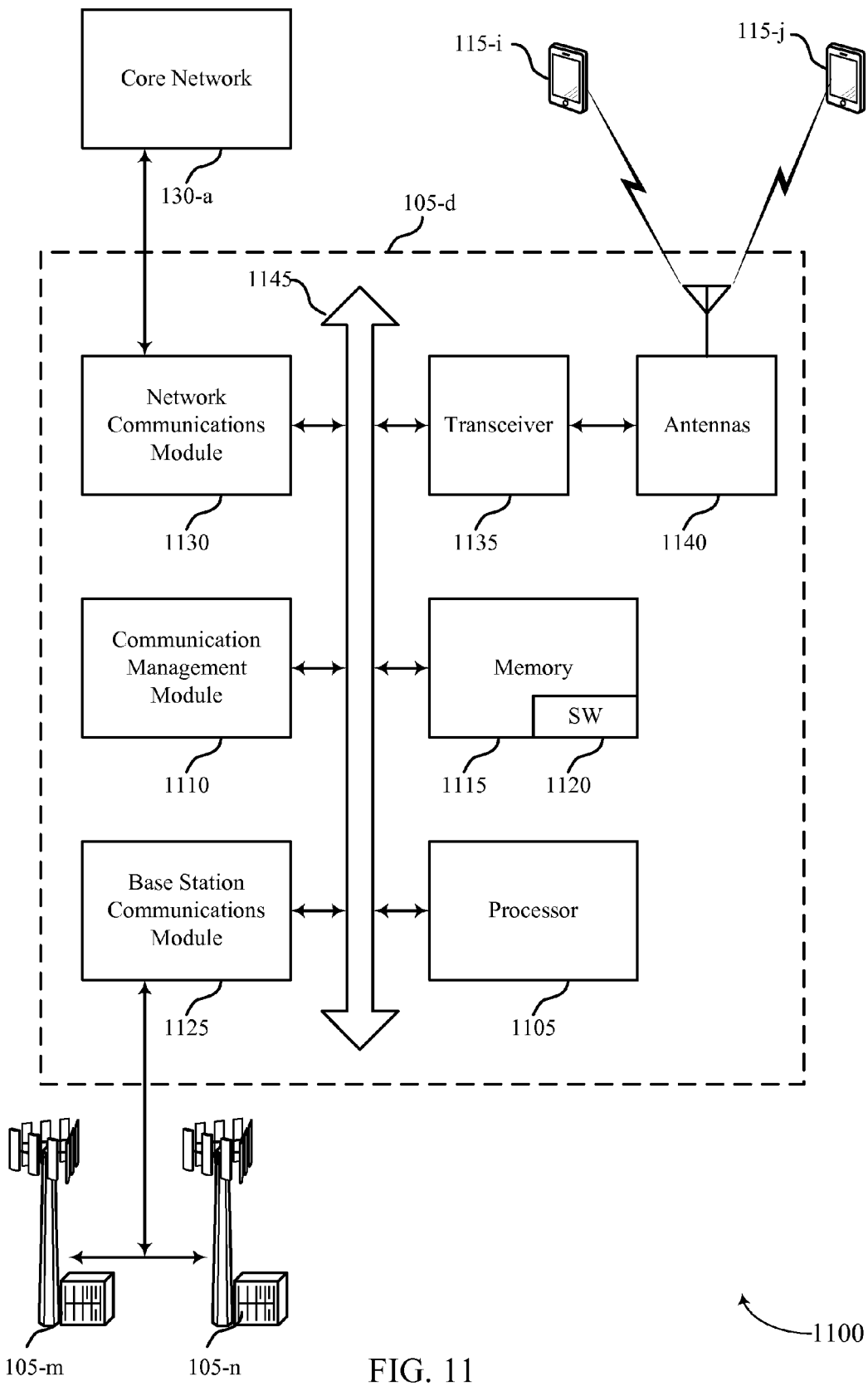
FIG. 11 shows a diagram of a system for group priority handling in a D2D wireless communication in accordance with various aspects of the present disclosure.

FIG. 11 shows a diagram of a system 1100 for group priority handling in a D2D wireless communication in accordance with various aspects of the present disclosure. System 1100 may include a base station 105-d, which may be an example of an base station 105-d described above with reference to FIGS. 1-10. The base station 105-d may include a communication management module 1110, which may be an example of a communication management module 810 described with reference to FIGS. 2-10. The base station 105-d may also include components for bi-directional voice and data communications including components for transmitting communications and components for receiving communications. For example, the base station 105-d may communicate bi-directionally with base station 105-d and/or a base station 105-d.

In some cases, the base station 105-d may have one or more wired backhaul links. The base station 105-d may have a wired backhaul link (e.g., S1 interface, etc.) to the core network 130-a. The base station 105-d may also communicate with other base stations 105, such as base station 105-m and base station 105-n via inter-base station backhaul links (e.g., an X2 interface). Each of the base stations 105 may communicate with UEs 115 (e.g., UE 115-i and UE 115-j) using the same or different wireless communications technologies. In some cases, base station 105-d may communicate with other base stations such as 105-m and/or 105-n utilizing base station communications module 1125. In some cases, base station communications module 1125 may provide an X2 interface within an LTE/LTE-A wireless communication network technology to provide communication between some of the base stations 105-m and 105-n. In some cases, base station 105-d may communicate with other base stations through core network 130. In some cases, base station 105-d may communicate with the core network 130 through network communications module 1130.

The base station 105-d may include, a processor module 1105, memory 1115 (including software (SW) 1120), transceiver 1135, and antenna(s) 1140, which each may be in communication, directly or indirectly, with each other (e.g., over bus system 1145). The transceiver 1135 may be configured to communicate bi-directionally, via the antenna(s) 1140, with the UEs 115, which may be multi-mode devices. The transceiver 1135 (and/or other components of the base station 105-d) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-d may include multiple transceivers 1135, each with one or more associated antennas 1140. The transceiver module may be an example of a combined receiver 805 and transmitter 815 of FIG. 8.

The memory 1115 may include RAM and ROM. The memory 1115 may also store computer-readable, computer-executable software code 1120 containing instructions that are configured to, when executed, cause the processor module 1110 to perform various functions described herein (e.g., group priority handling for D2D wireless communication, selecting coverage enhancement techniques, call processing, database management, message routing, etc.). Alternatively, the software 1120 may not be directly executable by the processor module 1105 but be configured to cause the computer, e.g., when compiled and executed, to perform functions described herein.

The processor module 1105 may include an intelligent hardware device, e.g., a CPU, a microcontroller, an ASIC, etc. The processor module 1105 may include various special purpose processors such as encoders, queue processing modules, base band processors, radio head controllers, digital signal processor (DSPs), and the like.

The base station communications module 1125 may manage communications with other base stations 105. The communications management module may include a controller and/or scheduler for controlling communications with UEs 115-i and/or 115-j in cooperation with other base stations 105. For example, the base station communications module 1125 may coordinate scheduling for transmissions to UEs 115-i and/or 115-j for various interference mitigation techniques such as beamforming and/or joint transmission.

Figure 12:
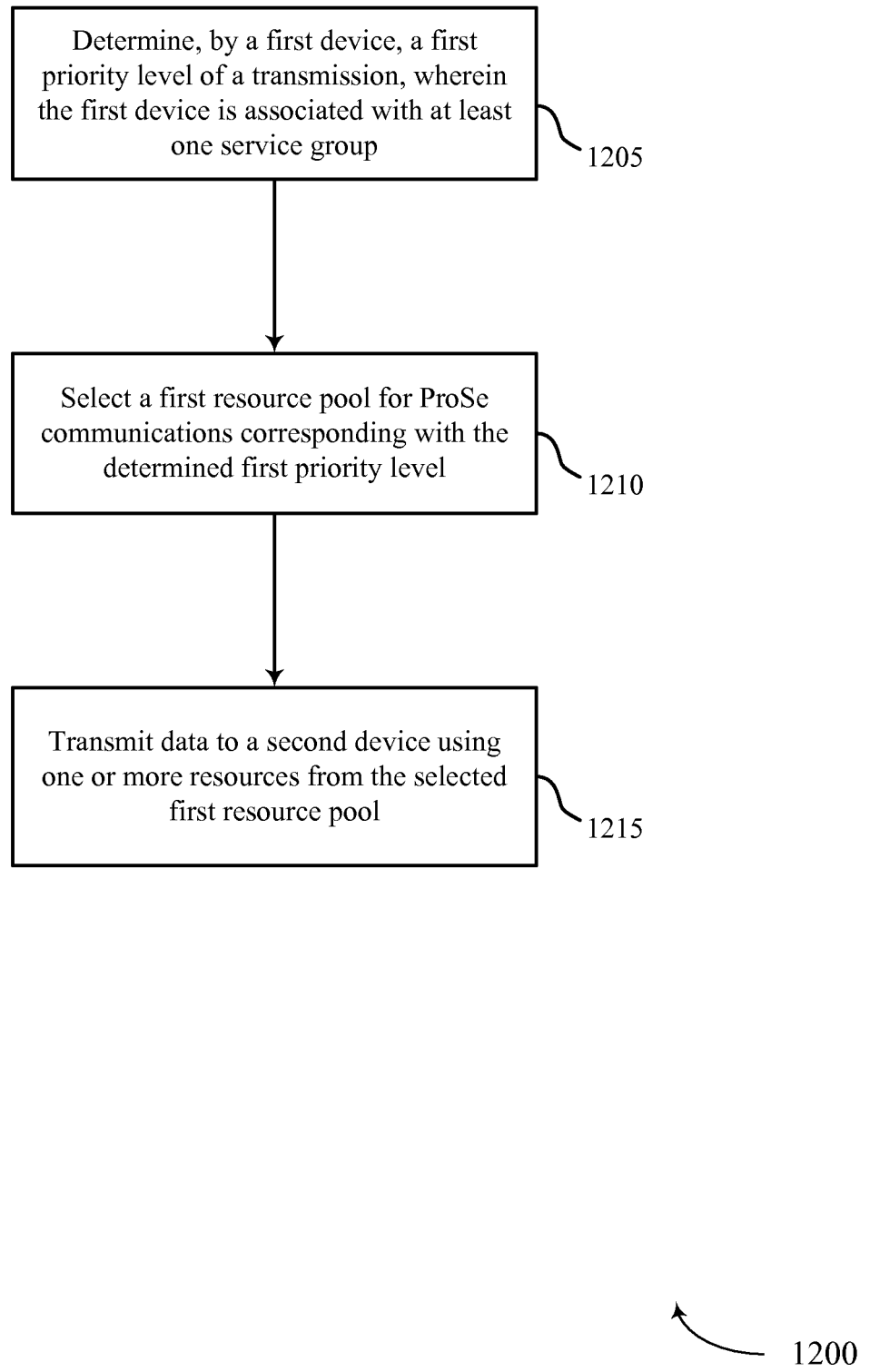
FIG. 12 shows a flowchart illustrating a method that supports group priority handling for D2D wireless communication in accordance with various aspects of the present disclosure.

FIG. 12 shows a flowchart illustrating a method 1200 that supports group priority handling for D2D wireless communication in accordance with various aspects of the present disclosure. The operations of method 1200 may be implemented by a UE 115 or its components as described with reference to FIGS. 1-11. For example, the operations of method 1200 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 1205, a first device (e.g., the UE 115) may determine a first priority level of a transmission, wherein the first device is associated with at least one service group as described above with reference to FIGS. 2-3. In certain examples, the operations of block 1205 may be performed by the group priority module 510 as described above with reference to FIG. 5.

At block 1210, the first device may select a first resource pool for ProSe communications corresponding with the determined first priority level as described above with reference to FIGS. 2-3. In certain examples, the operations of block 1210 may be performed by the resource allocation module 515 as described above with reference to FIG. 5.

At block 1215, the first device may transmit data to a second device using one or more resources from the selected first resource pool as described above with reference to FIGS. 2-3. In certain examples, the operations of block 1215 may be performed by the transmitter 415 as described above with reference to FIG. 4.

Figure 13:
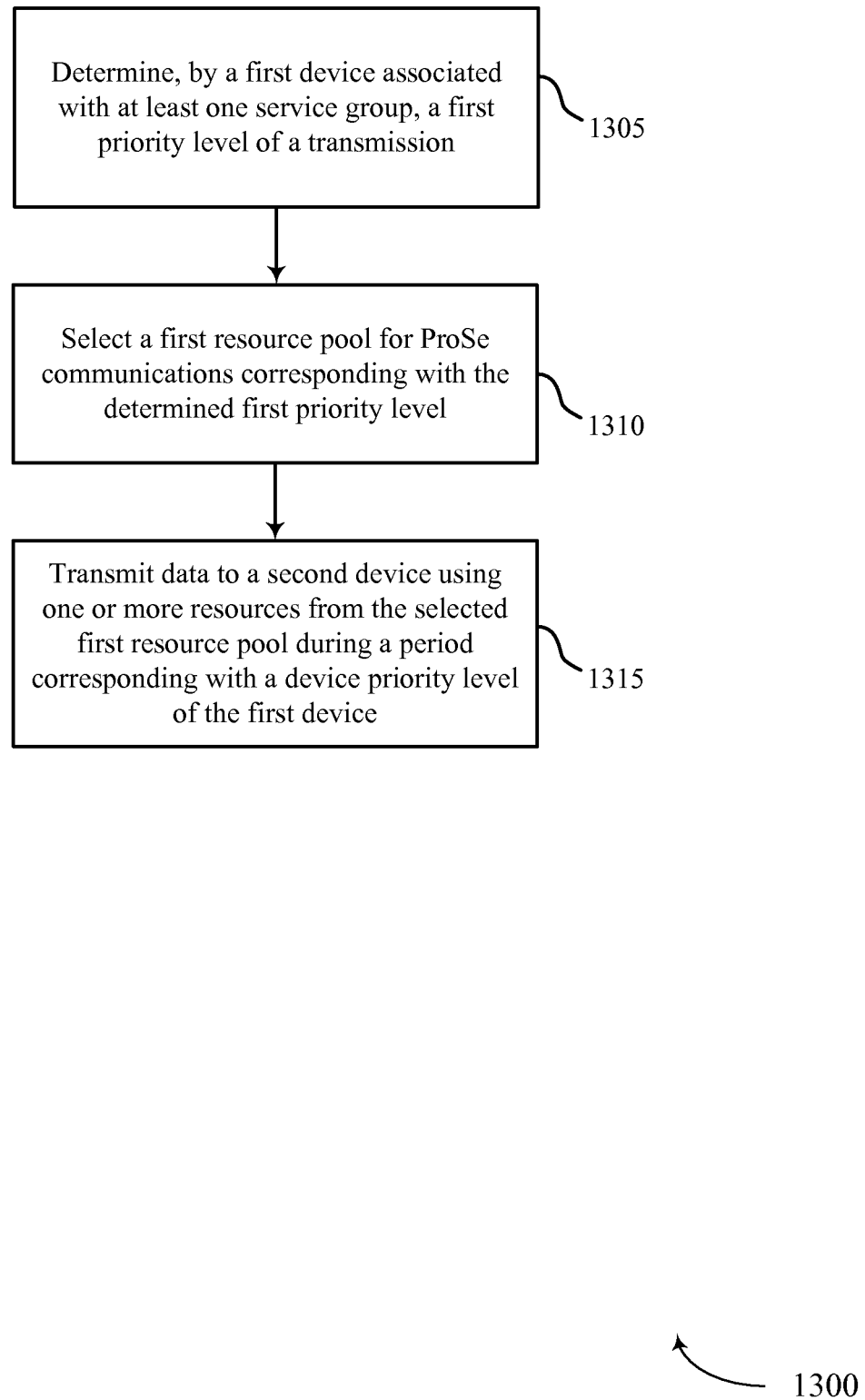
FIG. 13 shows a flowchart illustrating a method that supports group priority handling for wireless D2D communication in accordance with various aspects of the present disclosure.

FIG. 13 shows a flowchart illustrating a method 1300 that supports group priority handling for wireless D2D communication in accordance with various aspects of the present disclosure. The operations of method 1300 may be implemented by a UE 115 or its components as described with reference to FIGS. 1-7. For example, the operations of method 1300 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of method 1200 of FIG. 12.

At block 1305, a first device (e.g., the UE 115) associated with at least one service group may determine a first priority level of a transmission as described above with reference to FIGS. 2-3. In certain examples, the operations of block 1305 may be performed by the group priority module 510 as described above with reference to FIG. 5.

At block 1310, the first device may select a first resource pool for ProSe communications corresponding with the determined first priority level as described above with reference to FIGS. 2-3. In certain examples, the operations of block 1310 may be performed by the resource allocation module 515 as described above with reference to FIG. 5.

At block 1315, the first device may transmit data to a second device using one or more resources from the selected first resource pool during a period corresponding with a device priority level of the first device as described above with reference to FIGS. 2-3. In certain examples, the operations of block 1315 may be performed by the transmitter 415 as described above with reference to FIG. 4.

Figure 14:
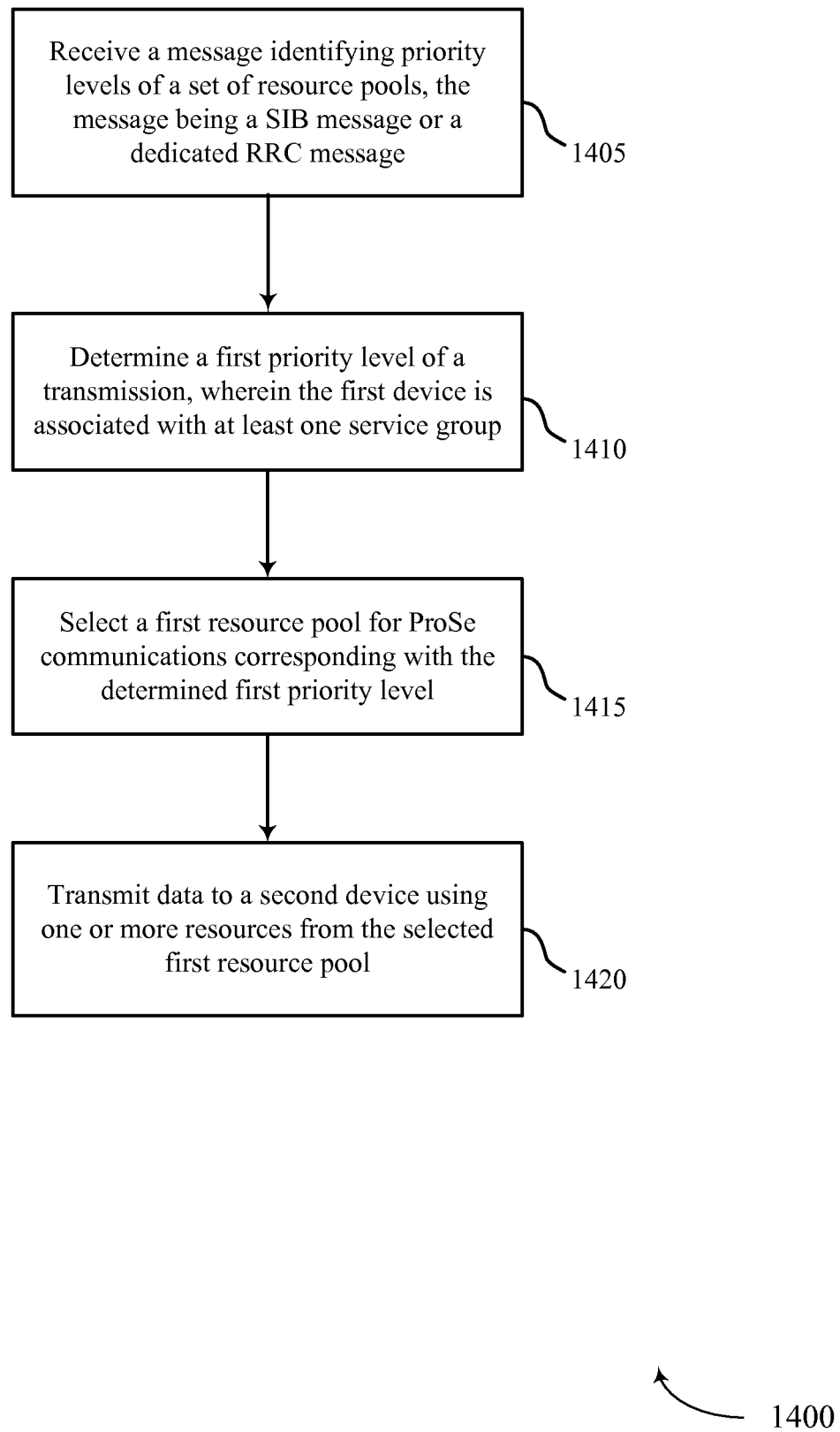
FIG. 14 shows a flowchart illustrating a method that supports group priority handling for wireless D2D communication in accordance with various aspects of the present disclosure.

FIG. 14 shows a flowchart illustrating a method 1400 that supports group priority handling for wireless D2D communication in accordance with various aspects of the present disclosure. The operations of method 1400 may be implemented by a UE 115 or its components as described with reference to FIGS. 1-7. For example, the operations of method 1400 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1200, and 1300 of FIGS. 12-13.

At block 1405, a first device (e.g., the UE 115) may receive a message identifying priority levels of a plurality of resource pools, the message being a SIB message or a dedicated RRC message as described above with reference to FIGS. 2-3. In certain examples, the operations of block 1405 may be performed by the receiver 405 as described above with reference to FIG. 4.

At block 1410, the first device may determine a first priority level of a transmission, wherein the first device is associated with at least one service group as described above with reference to FIGS. 2-3. In certain examples, the operations of block 1205 may be performed by the group priority module 510 as described above with reference to FIG. 5.

At block 1415, the first device may select a first resource pool for ProSe communications corresponding with the determined first priority level as described above with reference to FIGS. 2-3. In certain examples, the operations of block 1415 may be performed by the resource allocation module 515 as described above with reference to FIG. 5.

At block 1420, the first device may transmit data to a second device using one or more resources from the selected first resource pool as described above with reference to FIGS. 2-3. In certain examples, the operations of block 1420 may be performed by the transmitter 415 as described above with reference to FIG. 4.

Figure 15:
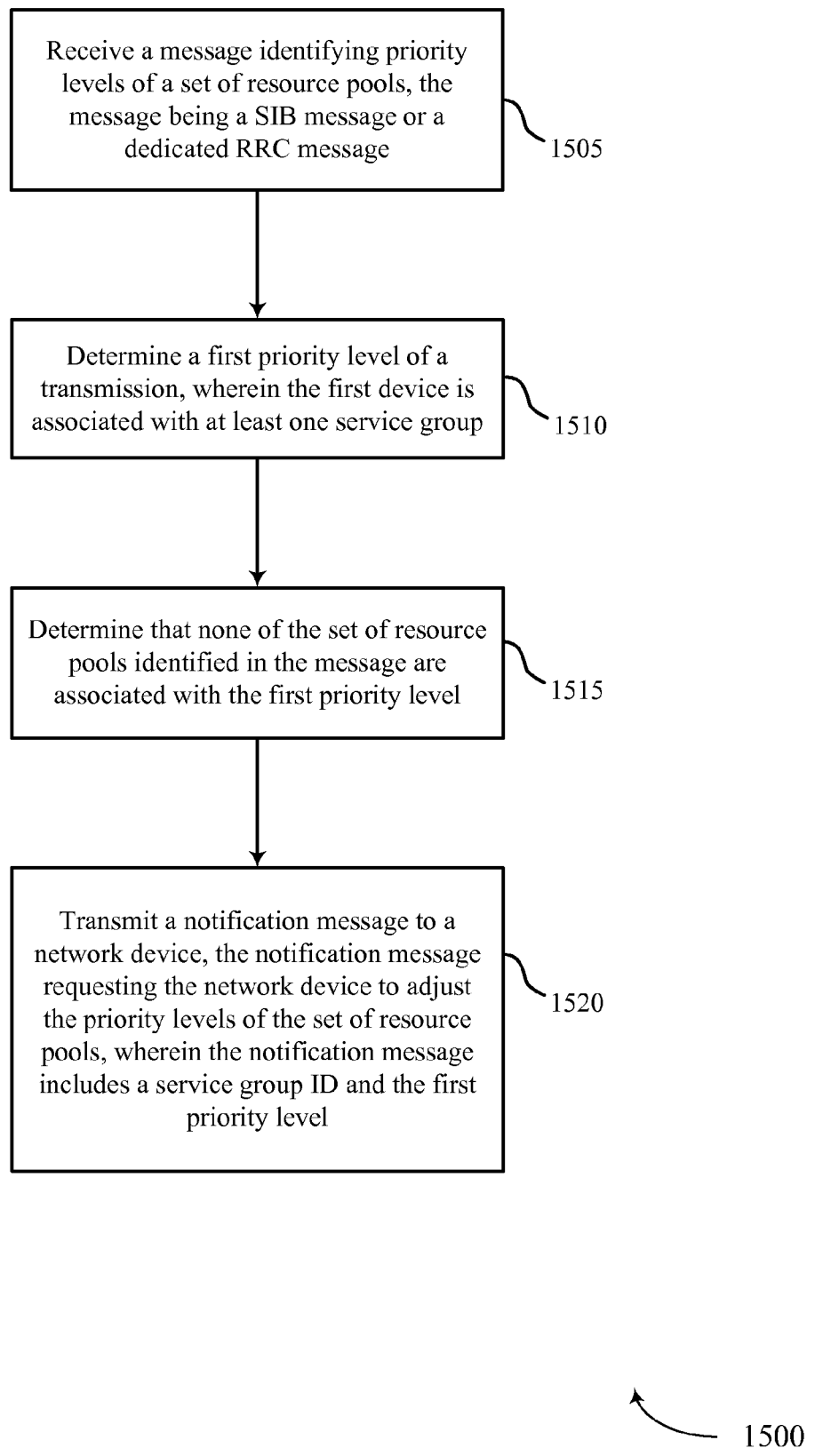
FIG. 15 shows a flowchart illustrating a method that supports group priority handling for wireless D2D communication in accordance with various aspects of the present disclosure.

FIG. 15 shows a flowchart illustrating a method 1500 that supports group priority handling for wireless D2D communication in accordance with various aspects of the present disclosure. The operations of method 1500 may be implemented by a UE 115 or its components as described with reference to FIGS. 1-7. For example, the operations of method 1500 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1200, 1300, and 1400 of FIGS. 12-14.

At block 1505, a first device (e.g., the UE 115) may receive a message identifying priority levels of a plurality of resource pools, the message being a SIB message or a dedicated RRC message as described above with reference to FIGS. 2-3. In certain examples, the operations of block 1505 may be performed by the receiver 405 as described above with reference to FIG. 4.

At block 1510, the first device may determine a first priority level of a transmission, wherein the first device is associated with at least one service group as described above with reference to FIGS. 2-3. In certain examples, the operations of block 1510 may be performed by the group priority module 510 as described above with reference to FIG. 5.

At block 1515, the first device may determine that none of the plurality of resource pools identified in the message are associated with the first priority level as described above with reference to FIGS. 2-3. In certain examples, the operations of block 1515 may be performed by the failure detection module 610 as described above with reference to FIG. 6.

At block 1520, the first device may transmit a notification message to a network device, the notification message requesting the network device to adjust the priority levels of the plurality of resource pools as described above with reference to FIGS. 2-3. The notification message may include a service group ID and the first priority level. In certain examples, the operations of block 1520 may be performed by the notification module 615 as described above with reference to FIG. 6.

Figure 16:
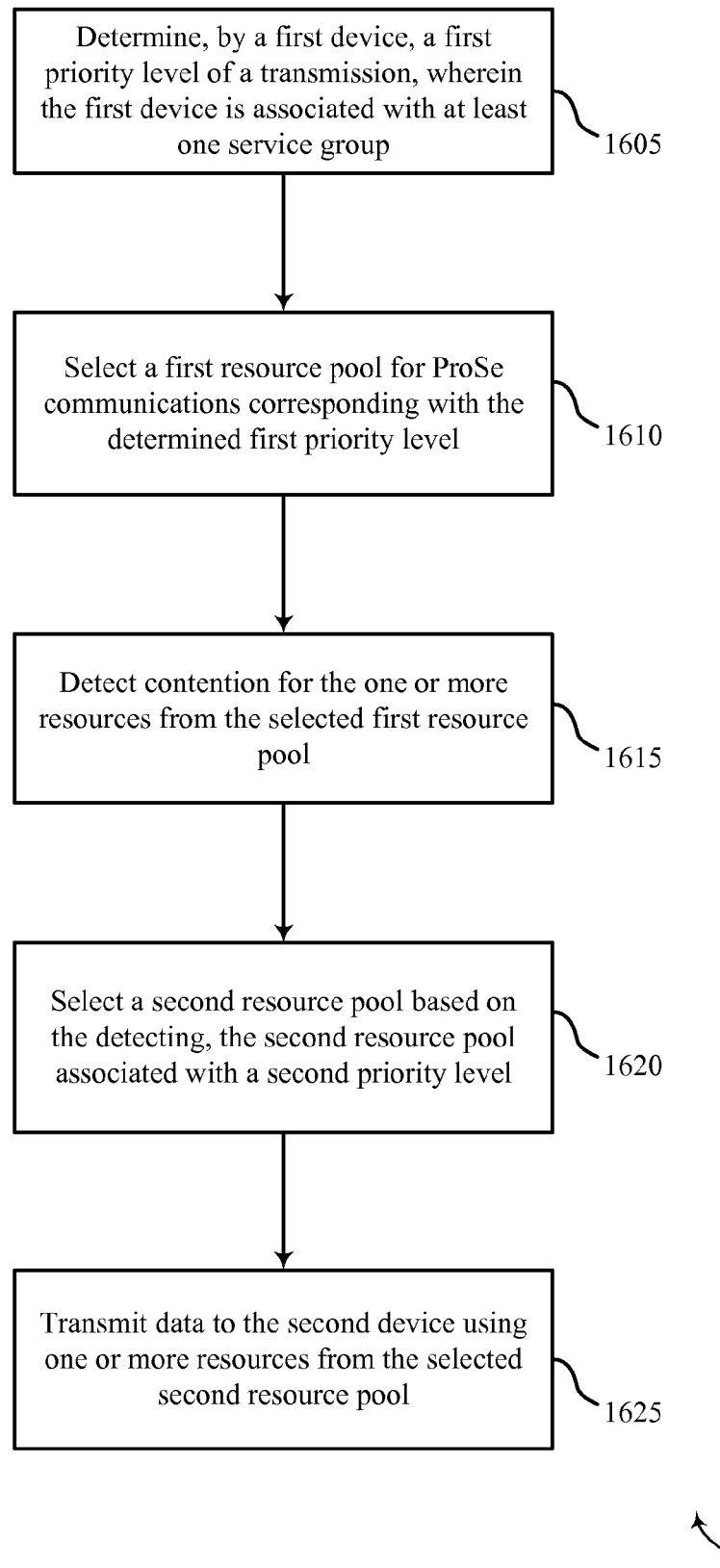
FIG. 16 shows a flowchart illustrating a method that supports group priority handling for mode 2 communication in accordance with various aspects of the present disclosure.

FIG. 16 shows a flowchart illustrating a method 1600 that supports group priority handling for mode 2 communication in accordance with various aspects of the present disclosure. The operations of method 1600 may be implemented by a UE 115 or its components as described with reference to FIGS. 1-7. For example, the operations of method 1600 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1200, 1300, 1400, and 1500 of FIGS. 12-15.

At block 1605, a first device (e.g., the UE 115) may determine a first priority level of a transmission, wherein the first device is associated with at least one service group as described above with reference to FIGS. 2-3. In certain examples, the operations of block 1605 may be performed by the group priority module 510 as described above with reference to FIG. 5.

At block 1610, the first device may select a first resource pool for ProSe communications corresponding with the determined first priority level as described above with reference to FIGS. 2-3. In certain examples, the operations of block 1610 may be performed by the resource allocation module 515 as described above with reference to FIG. 5.

At block 1615, the first device may detect contention for the one or more resources from the selected first resource pool as described above with reference to FIGS. 2-3. In certain examples, the operations of block 1615 may be performed by the contention detection module 620 as described above with reference to FIG. 6.

At block 1620, the first device may select a second resource pool based at least in part on the detecting, the second resource pool associated with a second priority level as described above with reference to FIGS. 2-3. In certain examples, the operations of block 1620 may be performed by the resource allocation module 515 as described above with reference to FIG. 5.

At block 1625, the first device may transmit data to the second device using one or more resources from the selected second resource pool as described above with reference to FIGS. 2-3. In certain examples, the operations of block 1625 may be performed by the transmitter 415 as described above with reference to FIG. 4.

Figure 17:
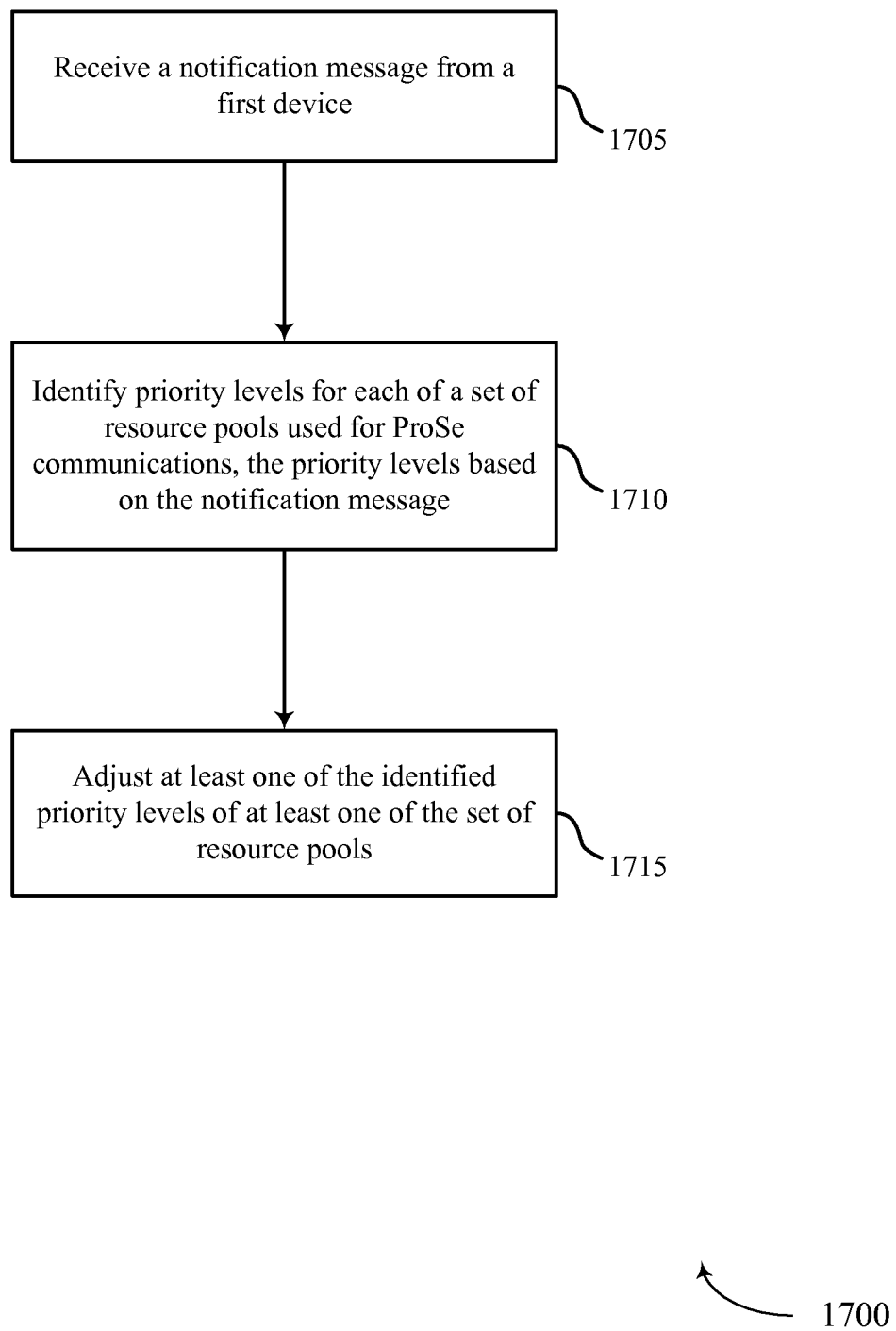
FIG. 17 shows a flowchart illustrating a method that supports group priority handling for wireless D2D communication in accordance with various aspects of the present disclosure.

FIG. 17 shows a flowchart illustrating a method 1700 that supports group priority handling for wireless D2D communication in accordance with various aspects of the present disclosure. The operations of method 1700 may be implemented by a base station 105 or its components as described with reference to FIGS. 1-11. For example, the operations of method 1700 may be performed by the communication management module 810 as described with reference to FIGS. 4-11. In some examples, a base station 105 may execute a set of codes to control the functional elements of the base station 105 to perform the functions described below. Additionally or alternatively, the base station 105 may perform aspects the functions described below using special-purpose hardware.

At block 1705, the base station 105 may receive a notification message from a first device as described above with reference to FIGS. 2-3. In certain examples, the operations of block 1705 may be performed by the notification message module 905 as described above with reference to FIG. 9.

At block 1710, the base station 105 may identify priority levels for each of a plurality of resource pools used for ProSe communications, the priority levels based at least in part on the notification message as described above with reference to FIGS. 2-3. In certain examples, the operations of block 1710 may be performed by the resource configuration module 910 as described above with reference to FIG. 9.

At block 1715, the base station 105 may adjust at least one of the identified priority levels of at least one of the plurality of resource pools as described above with reference to FIGS. 2-3. In certain examples, the operations of block 1715 may be performed by the priority scheduling module 915 as described above with reference to FIG. 9.

Thus, methods 1200, 1300, 1400, 1500, 1600, and 1700 may provide for group priority handling for wireless D2D communication. It should be noted that methods 1200, 1300, 1400, 1500, 1600, and 1700 describe possible implementation, and that the operations and the steps may be rearranged or otherwise modified such that other implementations are possible. In some examples, aspects from two or more of the methods 1200, 1300, 1400, 1500, 1600, and 1700 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   determining, by a first device, a first priority level of a transmission, wherein the first device is associated with at least one service group;
   receiving a message identifying priority levels of a plurality of resource pools;
   determining that none of the plurality of resource pools identified in the message are associated with the first priority level of the transmission;
   transmitting a notification message to a network device, the notification message requesting the network device to adjust the priority levels of the plurality of resource pools, wherein the notification message comprises a service group identification (ID) and the first priority level of the transmission;
   selecting a first resource pool for proximity service (ProSe) communications corresponding with the first priority level of the transmission; and
   transmitting data to the second device using one or more resources from the selected first resource pool.

2. The method of claim 1, wherein the first priority level of the transmission is based at least in part on a device priority level associated with the first device or the second device.

3. The method of claim 1, further comprising:
   transmitting data to the second device during a period corresponding with a device priority level of the first device.

4. The method of claim 1, wherein
   the message is a system information block (SIB) message or a dedicated radio resource control (RRC) message.

5. The method of claim 1, wherein the first resource pool comprises a scheduling assignment (SA) resource pool or data resource pools or a combination thereof.

6. The method of claim 1, wherein the first device is preconfigured to be associated with the at least one service group.

7. The method of claim 1, wherein the at least one service group is associated with a unique group identification (ID).

8. The method of claim 1, wherein the first priority level of the transmission is based at least in part on a service group priority level associated with the first device or the second device.

9. The method of claim 1, further comprising:
   detecting contention for the one or more resources from the selected first resource pool;
   selecting a second resource pool based at least in part on the detecting, the second resource pool associated with a second priority level; and
   transmitting data to the second device using one or more resources from the selected second resource pool.

10. The method of claim 9, wherein the second priority level associated with the second resource pool is lower than the first priority level associated with the first resource pool.

11. A method of wireless communication at a base station, comprising:
    receiving a notification message from a first device;
    identifying priority levels for each of a plurality of resource pools used for ProSe communications, the priority levels based at least in part on the notification message;
    adjusting at least one of the identified priority levels of at least one of the plurality of resource pools; and
    transmitting a response message to the first device, the response message identifying the adjusted priority levels of the at least one of the plurality of resource pools.

12. The method of claim 11, wherein the response message instructs the first device to wait a predetermined time period before transmitting data on at least one of the plurality of resource pools.

13. The method of claim 11, wherein the notification message comprises a service group identification (ID) and a service group ID priority level.

14. An apparatus for wireless communication at a user equipment (UE), comprising:
    means for determining, by a first device, a first priority level of a transmission, wherein the first device is associated with at least one service group;
    means for receiving a message identifying priority levels of a plurality of resource pools;
    means for determining that none of the plurality of resource pools identified in the message are associated with the first priority level of the transmission; and
    means for transmitting a notification message to a network device, the notification message requesting the network device to adjust the priority levels of the plurality of resource pools, wherein the notification message comprises a service group identification (ID) and the first priority level of the transmission;
    means for selecting a first resource pool for proximity service (ProSe) communications corresponding with the first priority level of the transmission; and
    means for transmitting data the second device using one or more resources from the selected first resource pool.

15. The apparatus of claim 14, wherein the first priority level of the transmission is based at least in part on a device priority level associated with the first device or the second device.

16. The apparatus of claim 14, further comprising:
    means for transmitting data to the second device during a period corresponding with a device priority level of the first device.

17. The apparatus of claim 14, wherein
    the message is a system information block (SIB) message or a dedicated radio resource control (RRC) message.

18. The apparatus of claim 14, wherein the first resource pool comprises a scheduling assignment (SA) resource pool or data resource pools or a combination thereof.

19. The apparatus of claim 14, wherein the first device is preconfigured to be associated with the at least one service group.

20. The apparatus of claim 14, wherein the at least one service group is associated with a unique group identification (ID).

21. An apparatus for wireless communication at a base station, comprising:

means for receiving a notification message from a first device;

means for identifying priority levels for each of a plurality of resource pools used for proximity service (ProSe) communications, the priority levels based at least in part on the notification message;

means for adjusting at least one of the identified priority levels of at least one of the plurality of resource pools; and means for transmitting a response message to the first device, the response message identifying the adjusted priority levels of the at least one of the plurality of resource pools.

22. The apparatus of claim 21, wherein the response message instructs the first device to wait a predetermined time period before transmitting data on at least one of the plurality of resource pools.

23. The apparatus of claim 21, wherein the notification message comprises a service group identification (ID) and a service group ID priority level.

* * * * *